(12) United States Patent
Everhart et al.

(10) Patent No.: US 8,271,420 B2
(45) Date of Patent: Sep. 18, 2012

(54) SYSTEMS AND METHODS FOR INTEGRATING EDUCATIONAL SOFTWARE SYSTEMS

(75) Inventors: Deborah Everhart, Washington, DC (US); Robert L. Alcorn, Arlington, VA (US)

(73) Assignee: Blackboard Inc., Washington, DC (US)

( * ) Notice: Subject to any disclaimer, the term of this patent is extended or adjusted under 35 U.S.C. 154(b) by 915 days.

(21) Appl. No.: 12/347,071

(22) Filed: Dec. 31, 2008

(65) Prior Publication Data

US 2009/0182716 A1 Jul. 16, 2009

Related U.S. Application Data

(63) Continuation-in-part of application No. 11/822,653, filed on Jul. 9, 2007, now Pat. No. 7,788,207.

(51) Int. Cl.
*G06F 17/00* (2006.01)
*G06N 5/02* (2006.01)

(52) U.S. Cl. .......................................................... 706/49
(58) Field of Classification Search ...................... 706/49
See application file for complete search history.

(56) References Cited

U.S. PATENT DOCUMENTS

| | | |
|---|---|---|
| 5,943,423 A | 8/1999 | Muftic |
| 6,368,110 B1 | 4/2002 | Koenecke et al. |
| 6,484,199 B2 | 11/2002 | Eyal |
| 6,652,287 B1 | 11/2003 | Strub et al. |
| 6,988,138 B1 | 1/2006 | Alcorn et al. |
| 6,998,138 B2 | 2/2006 | Chew et al. |
| 7,493,396 B2 | 2/2009 | Alcorn et al. |
| 7,558,853 B2 | 7/2009 | Alcorn et al. |
| 7,657,782 B2 | 2/2010 | Das et al. |
| 7,788,207 B2 * | 8/2010 | Alcorn et al. ................... 706/49 |
| 2002/0087560 A1 | 7/2002 | Bardwell |
| 2003/0037174 A1 | 2/2003 | Lavin et al. |
| 2005/0125353 A1* | 6/2005 | Schlesinger et al. ............ 705/51 |
| 2005/0202392 A1 | 9/2005 | Allen et al. |
| 2006/0004815 A1 | 1/2006 | Murata et al. |
| 2006/0235948 A1 | 10/2006 | Bjernestad et al. |
| 2006/0259351 A1 | 11/2006 | Yaskin et al. |
| 2007/0016650 A1 | 1/2007 | Gilbert et al. |
| 2008/0263152 A1 | 10/2008 | Daniels et al. |

FOREIGN PATENT DOCUMENTS

EP 1 403 796 A1 3/2004

(Continued)

OTHER PUBLICATIONS

Matson, E. , "UmbrellaDB: Heterogeneous Data Source Access Using a Virtual Database Architecture", IEEE, Oct. 6, 2002, pp. 592-597, vol. 1, International Conference on Systems, Man and Cybernetics, Yasmine, Hammamet, Tunesia.

(Continued)

*Primary Examiner* — Michael B Holmes
(74) *Attorney, Agent, or Firm* — McDermott Will & Emery LLP

(57) ABSTRACT

Systems and methods are provided for integrating educational software. In one implementation, a first method includes providing on a first server an integrated learning management system adapted to exchange education data and materials via a connector interface, providing on the first server a first component which responds to requests made by the integrated system via the connector interface to exchange education data and materials with a first source learning management system, and exchanging education data and materials between the integrated system and the first system via the first component by use of the connector interface.

27 Claims, 19 Drawing Sheets

FOREIGN PATENT DOCUMENTS

| | | |
|---|---|---|
| EP | 1403796 A1 | 3/2004 |
| EP | 1 521 182 A1 | 4/2005 |
| EP | 1521182 A1 | 4/2005 |
| WO | WO 02/069117 A2 | 9/2002 |
| WO | WO 2007/043893 A2 | 4/2007 |

OTHER PUBLICATIONS

Maibaum, M., et al., "BioMap: Gene Family Based Integration of Heterogeneous Biological Databases Using AutoMed Metadata", IEEE, Aug. 30, 2004, pp. 384-388, Database and Expert Systems Applications, Proceedings of the 15th International Workshop on Zaragoza, Piscataway, NJ.

Gupta, A., et al., "Virtual Database Technology", IEEE, Feb. 23, 1998, pp. 297-301, Los Alamitos, CA.

Geoff Collier et al., "IMS Enterprise Information Model," IMS Global Learning Consortium, Inc., Dec. 21, 1999 (31 pages).

Colin Smythe, "IMS Enterprise Services Specification: Overview," IMS Global Learning Consortium, Inc., 2004 (24 pages).

"IMS Enterprise Services Common Data Definitions," IMS Global Learning Consortium, Inc., Jun. 11, 2004 (35 pages).

"IMS Enterprise Services Conformance Specification," IMS Global Learning Consortium, Inc., Jun. 11, 2004 (16 pages).

"IMS Enterprise Services Specification," IMS Global Learning Consortium, Inc., Jun. 11, 2004 (21 pages).

"IMS Enterprise Services Core Use Case Descriptions," IMS Global Learning Consortium, Inc., Jun. 11, 2004 (42 pages).

"IMS Group Management Services WSDL Binding," IMS Global Learning Consortium, Inc., Jun. 11, 2004 (29 pages).

"IMS Person Management Services WSDL Binding," IMS Global Learning Consortium, Inc., Jun. 11, 2004 (29 pages).

"IMS Person Management Services Information Model," IMS Global Learning Consortium, Inc., Jun. 11, 2004 (39 pages).

"IMS Membership Management Services WSDL Binding," IMS Global Learning Consortium, Inc., Jun. 11, 2004 (31 pages).

"IMS Group Management Services Information Model," IMS Global Learning Consortium, Inc., Jun. 11, 2004 (41 pages).

"IMS Membership Management Services Information Model," IMS Global Learning Consortium, Inc., Jun. 11, 2004 (40 pages).

"IMS Enterprise Services Best Practice and Implementation Guide," IMS Global Learning Consortium, Inc., Jun. 11, 2004 (86 pages).

Notification of Transmittal of the International Search Report of the International Application No. PCT/US08/04542, mailed Aug. 15, 2008.

Sneed, Harry M., "Encapsulating Legacy Software for Use in Client/Server Systems", IEEE, (1996), pp. 104-119.

Lupu, Ana-Ramona, et al., "Integrated Information Systems in Higher Education", WSEAS Transactions on Computers, (May 2008), pp. 473-482, Iss. 5, vol. 7.

Ahern, Terence, et al., "Open Protocols for Web-based Educational Materials", Frontiers in Education, (2001), pp. 1-31.

Communication and European Search Report, mailed Mar. 15, 2012, European Patent Office, Munich, Germany.

* cited by examiner

☒ ! Your location: arch inst 1 > Settings > Backboard Community System System Integration 📁 arch_inst_1 (Instruction level)

⚙️ Settings Blackboard Community System System Integration

To apply the value to child learning contexts, select Override Setting at Child Contexts. To prevent the value from being modified at child learning contexts, select Lock This Setting.

| Title | Value | Options |
|---|---|---|
| Enable Community System Integration* | ⦿ true/◯ false | ☐ Lock This Setting<br>☐ Override Setting at Child Contexts |
| Community System server URL (e.g. http://www.csserver.edu:80)* | http://iridium.qa.dc.blackboard.cc | ☐ Lock This Setting<br>☐ Override Setting at Child Contexts |
| Community System Session Timeout Handler Path (URL)* | /webapps/bb-integration-gateway | ☐ Lock This Setting<br>☐ Override Setting at Child Contexts |
| Enable run-time synchronization sending* | ⦿ true/◯ false | ☐ Lock This Setting<br>☐ Override Setting at Child Contexts |
| Enable run-time synchronization recording* | ⦿ true/◯ false | ☐ Lock This Setting<br>☐ Override Setting at Child Contexts |
| Run-Time synchronization secret* | arch | ☐ Lock This Setting<br>☐ Override Setting at Child Contexts |
| Display Warning message while accessing the Content Link* | ⦿ true/◯ false | ☐ Lock This Setting<br>☐ Override Setting at Child Contexts |

[ Save Values ] [ Cancel ]

*Required fields

④ Conflict Resolution

- Use Conflict Resolution ○ Never  ⊙ Always  ○ Only on Conflicts

Never: Fail for records that have conflicting IDs and do not add or update the record.
  Always: Use conflict resolution regardless of whether or not there is a conflict.
  Only on Conflicts: Use conflict resolution only when there is a conflict.

- Resolution Logic ⊙ Prefix  ○ Suffix

String [_____]

*This text can be alphanumeric and must be unique for each Learning Environment Integration (created in a case-insensitive fashion)*

⑤ Submit

Click Submit to finish  Click Cancel to quit

FROM FIG. 4A

FIG. 4B

Your Institution UNIVERSITY

Home Help Logout

My Institution | Courses | Community | Services | System Admin

ADMINISTRATOR PANEL >USERS

Users

🔲 User  🔲 Batch Add  🔲 Remove  🔲 Batch Remove  ✓ Available  ✗ Unavailable

Search: [Username ▼] [GO] [Starts with ▼] [        ] [GO]

Options: [User Information ▼] — 910

| Status | Last Name | First Name | Username | Email | Learning Environment | |
|---|---|---|---|---|---|---|
| | Administrator | Blackboard | administrator | team@blackboard.com | local | Modify |
| | designer | designer | designer | | Vista University | Modify |
| | designer | designer | neo_designer | | neo | Modify |
| | designer | designer | vista_designer | | vista | Modify |
| | Guest | Blackboard | guest | | local | Modify |
| | Institution Admin | Blackboardbbb | admin | | Vista University | Modify |
| | Institution Admin | Blackboard | vista_admin | | vista | Modify |
| | Institution Admin | Blackboard | neo_admin | | neo | Modify |
| ⊘ | rob | rob | rob | | Vista University | Modify |
| | student | student | neo_student | | neo | Modify |
| | student | student | vista_student | | vista | Modify |
| ☐ | VistaUser | Vista | vistauser1 | team@blackboard.com | local | Modify |

🔄 Refresh  [Select All ▼] [GO]  Items Per Page [25 ▼] [GO]

FIG. 9

SYSTEMS AND METHODS FOR INTEGRATING EDUCATIONAL SOFTWARE SYSTEMS

This application is a Continuation-In-Part (CIP) of application Ser. No. 11/822,653, filed Jul. 9, 2007 now U.S. Pat. No. 7,788,207. The entire contents of each of the foregoing application are hereby incorporated by reference

BACKGROUND

I. Technical Field

The present invention generally relates to the field of educational software. More particularly, the invention relates to computerized systems and methods for integrating educational software associated with one or more source systems, as well as synchronizing education data and migrating education data and materials between systems.

II. Background Information

Electronic learning (or e-learning) typically refers to facilitating and enhancing learning through the use of computers. Electronic learning can include a variety of activities, such as video conferencing and/or web casting of course instruction, online storage of course materials, online storage of student portfolios, online-based course and/or testing materials, discussion boards, e-mail, blogs, and text chat. In recent years, electronic learning has grown rapidly as educational institutions have used it to supplement classroom education. For example, a traditional course may have an online or electronic counterpart in which students may access course materials, interact with other classmates, and submit questions to a teacher, all via computerized systems. Furthermore, educational institutions offer courses that are only available through electronic learning. These courses exist solely in an electronic realm where students attend and complete a course via a computer of their choosing.

To attend an electronic learning course, a student is typically provided with credentials (e.g., a username and password) for accessing a computerized system, such as a website. Once authenticated, the student is able to, for example, view a webcast of a course. During or after the webcast, the student may access course materials or participate in further online activities (e.g., discussion boards, e-mail, blogs, and text chat). Furthermore, administrator users may access the system in order to create and/or modify course enrollments, for example. Teacher users may also access the system in order to, for example, create and/or modify course materials and update grades. An example of a system that provides education online, including the ability of users to have multiple roles in multiple courses, is disclosed in U.S. Pat. No. 6,988,138 B1, issued Jan. 17, 2006, entitled "Internet-Based Education Support System and Methods," the disclosure of which is incorporated herein by reference.

Students may also be enrolled in multiple electronic learning courses. In order to access those courses, the student may need to navigate using, for example, a web browser, to other websites. For example, the student may need to navigate to a website that only provides access to one course. The student may need to navigate to other websites to access other courses. Each website may require the student to submit a different set of credentials for authentication. Furthermore, each website may separately store course materials and provide access to online activities, which may be specific to the courses accessed from each website. These websites typically do not communicate or share information and, consequently, are unable to determine that a student is enrolled in other courses.

Systems also present significant drawbacks for other users, such as administrators and teachers. For example, administrators often must access separate systems and learn separate methods for setting up and managing courses and users. For example, an administrator's responsibilities may include updating course enrollments for courses that are provided by different systems. Consequently, the administrator may need to access each system and use functionality that is specific to each system to make the changes. Similarly, teachers may need to access separate systems and learn separate methods to create, modify, and manage course materials and grades.

Also, a legacy source system which delivers education data and materials relied upon by an educational institution typically represents a significant investment in resources expended in establishing the source system infrastructure. For example, typically a great deal of effort is required to establish a feed of student information system data, such as user, course name, course availability, and enrollment data, into a legacy source system. Once such a feed is established, there is generally reluctance to reinvest in a different feed conforming to the needs of a new system. Often, the student information system (SIS) data is tightly coupled to the legacy source system, requiring not only educational materials, but also SIS data, to be transferred over to a replacement system. Accordingly, an institution often is "locked in" to the legacy source system, presenting a hurdle for moving to a newer system, particularly where an institution may simply be interested in conducting a limited evaluation of the newer system in advance of a full migration to the newer system.

As is evident from the foregoing discussion, as electronic learning grows, users, including students, teachers, and administrators, frequently must access a variety of systems, maintain multiple sets of credentials, and navigate to separate websites for each course. With such configurations, students do not receive an electronic learning experience in which they are part of a community. Accordingly, disparate electronic learning systems do not provide students with a unified, central electronic learning experience. Furthermore, such configurations present drawbacks to teachers and administrators because they are unable to access one system to perform their tasks. Accordingly, a unified, central electronic learning experience would also benefit teachers and administrators by providing access to all courses and materials from a central aggregating site. Accordingly, there is a need for systems and methods for integrating disparate educational software systems.

SUMMARY

Consistent with an embodiment of the present invention, a computer-implemented method for integrating learning management systems may comprise providing on a first server an integrated learning management system adapted to exchange education data and materials via a connector interface; providing on the first server a first component which responds to requests made by the integrated system via the connector interface to exchange education data and materials with a first source education learning management system; and exchanging education data and materials between the integrated system and the first system via the first component by use of the connector interface.

Consistent with another embodiment of the present invention, a computer-implemented method for integrating learning management systems may comprise providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; providing on the first server a second component which responds to requests made by the integrated system via the connector interface to exchange education data and materials with a second source learning management system; and exchanging education data or materials between the integrated system and the second system via the second component by use of the connector interface.

Consistent with another embodiment of the present invention, a computer-implemented method for integrating learning management systems may comprise providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; and exchanging education data or materials with a second source learning management system via the first component by use of the connector interface.

Consistent with another embodiment of the present invention, a computer-implemented method for integrating learning management systems may comprise providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; providing on the first server a second component which responds to requests made by the integrated system via the connector interface to exchange education data and materials with a database, said database storing education data and materials being used by a second source learning management system for storing education data and materials; and receiving education data or materials from the database via a request made by the integrated system to the connector interface.

Consistent with another embodiment of the present invention, a computer-implemented method for integrating learning management systems may comprise providing a user interface, via an integrated system, by which educational materials are displayed to a user; and selecting visual elements provided by the user interface in response to a detected role of the user with respect to the educational materials.

Consistent with another embodiment of the present invention, a computer-implemented method for integrating learning management systems may comprise hosting first educational materials corresponding to a first course on an integrated system, the first educational materials having been previously hosted on a first source system; and obtaining via the connector interface first educational data corresponding to the first educational materials from the first source system, in response to accessing the first educational materials hosted on the integrated system.

Consistent with another embodiment of the present invention, a computer-implemented method for integrating learning management systems may comprise providing a user interface, via an integrated system, by which educational materials hosted on a first source system are displayed to a user enrolled in a course; and selecting visual elements provided by the user interface for displaying the educational materials, based on an indication that visual elements used to the display the educational materials are to correspond to visual elements used to display educational materials hosted by the integrated system.

Consistent with another embodiment of the present invention, a computer-implemented method for integrating learning management systems may comprise providing a user interface, via the integrated system, by which educational materials hosted on an integrated system are displayed to a user enrolled in a course; and selecting visual elements provided by the user interface for displaying the educational materials, based on an indication that visual elements used to the display the educational materials are to correspond to visual elements used to display educational materials hosted by a different learning management system.

Consistent with another embodiment of the present invention, a computer-implemented method for integrating learning management systems may comprise providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; determining capabilities of the first component for exchanging education data and materials by a query performed via the connector interface; and adjusting operations performed by the integrated system in response to a result of the query.

Consistent with another embodiment of the present invention, an integrated system comprises a connector interface adapted to exchange education data and materials in response to a first request by the integrated system; and a first component that exchanges education data and materials with a first source education learning management system, in response to the request made to the connector interface.

Consistent with another embodiment of the present invention, an integrated system comprises a connector interface adapted to exchange education data and materials in response to a first request by the integrated system; a first component that exchanges education data and materials with a first source education learning management system, in response to the request made to the connector interface; and a second component that exchanges education data and materials with a second source learning management system, in response to a second request made to the connector interface.

Consistent with another embodiment of the present invention, an integrated system comprises a connector interface adapted to exchange education data and materials in response to a first request by the integrated system; and a first component that exchanges education data and materials with a first source education learning management system, in response to the request made to the connector interface; wherein the first component exchanges education data and materials with a second source learning management system, in response to a second request made to the connector interface.

Consistent with another embodiment of the present invention, an integrated system comprises a connector interface adapted to exchange education data and materials in response to a first request by the integrated system; a first component that exchanges education data and materials with a first source education learning management system, in response to the request made to the connector interface; and a second component that retrieves education data and materials from a database, said database being used by a second source learning management system for storing education data and materials.

Consistent with another embodiment of the present invention, an integrated system comprises a user interface that provides educational materials for display to a user, and selects visual elements provided to the user in response to a detected role of the user with respect to the educational materials.

Consistent with another embodiment of the present invention, an integrated system is adapted to host first educational materials corresponding to a first course transferred from the source system; and the integrated system is adapted to issue an educational data request to the connector interface in response to access of the first educational materials hosted on the integrated system.

Consistent with another embodiment of the present invention, an integrated system comprises a user interface that provides educational materials for display to a user, and selects visual elements provided to the user based on an indication that visual elements used to display the educational materials correspond to visual elements used to display educational materials hosted by the integrated system.

Consistent with another embodiment of the present invention, an integrated system comprises a user interface that provides educational materials for display to a user, and selects visual elements provided to the user based on an indication that visual elements used to display the educational materials correspond to visual elements used to display educational materials hosted by a different learning management system.

Consistent with another embodiment of the present invention, an integrated system comprises a connector interface adapted to exchange education data and materials in response to a first request by the integrated system; and a first component that exchanges education data and materials with a first source education learning management system, in response to the request made to the connector interface; wherein the connector interface is responsive to a capability request from the integrated system; the first component is adapted to indicate its capabilities for exchanging education data and materials in response to the capability request; and operations performed by the integrated system are responsive to a result of the capability request.

Consistent with another embodiment of the present invention, one or more computer-readable mediums are provided that store program instructions, which when executed by a computer, cause the computer to implement a method comprising providing on a first server an integrated learning management system adapted to exchange education data and materials via a connector interface; providing on the first server a first component which responds to requests made by the integrated system via the connector interface to exchange education data and materials with a first source education learning management system; and exchanging education data and materials between the integrated system and the first system via the first component by use of the connector interface.

Consistent with another embodiment of the present invention, one or more computer-readable mediums are provided that store program instructions, which when executed by a computer, cause the computer to implement a method comprising providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; providing on the first server a second component which responds to requests made by the integrated system via the connector interface to exchange education data and materials with a second source learning management system; and exchanging education data or materials between the integrated system and the second system via the second component by use of the connector interface.

Consistent with another embodiment of the present invention, one or more computer-readable mediums are provided that store program instructions, which when executed by a computer, cause the computer to implement a method comprising providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; and exchanging education data or materials with a second source learning management system via the first component by use of the connector interface.

Consistent with another embodiment of the present invention, one or more computer-readable mediums are provided that store program instructions, which when executed by a computer, cause the computer to implement a method comprising providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; providing on the first server a second component which responds to requests made by the integrated system via the connector interface to exchange education data and materials with a database, said database storing education data and materials being used by a second source learning management system for storing education data and materials; and receiving education data or materials from the database via a request made by the integrated system to the connector interface.

Consistent with another embodiment of the present invention, one or more computer-readable mediums are provided that store program instructions, which when executed by a computer, cause the computer to implement a method comprising providing a user interface, via the integrated system, by which educational materials are displayed to a user; and selecting visual elements provided by the user interface in response to a detected role of the user with respect to the educational materials.

Consistent with another embodiment of the present invention, one or more computer-readable mediums are provided that store program instructions, which when executed by a computer, cause the computer to implement a method comprising hosting first educational materials corresponding to a first course on an integrated system, the first educational materials having been previously hosted on q first source system; and obtaining via the connector interface first educational data corresponding to the first educational materials from the first source system, in response to accessing the first educational materials hosted on the integrated system.

Consistent with another embodiment of the present invention, one or more computer-readable mediums are provided that store program instructions, which when executed by a computer, cause the computer to implement a method comprising providing a user interface, via an integrated system, by which educational materials hosted on a first source system are displayed to a user enrolled in a course; and selecting visual elements provided by the user interface for displaying the educational materials, based on an indication that visual elements used to the display the educational materials are to correspond to visual elements used to display educational materials hosted by the integrated system.

Consistent with another embodiment of the present invention, one or more computer-readable mediums are provided that store program instructions, which when executed by a computer, cause the computer to implement a method comprising providing a user interface, via the integrated system, by which educational materials hosted on the integrated system are displayed to a user enrolled in a course; and selecting visual elements provided by the user interface for displaying the educational materials, based on an indication that visual elements used to the display the educational materials are to correspond to visual elements used to display educational materials hosted by a different learning management system.

Consistent with another embodiment of the present invention, one or more computer-readable mediums are provided that store program instructions, which when executed by a computer, cause the computer to implement a method comprising providing on a first server an integrated learning management system adapted to exchange education data and materials via a connector interface; providing on the first server a first component which responds to requests made by the integrated system via the connector interface to exchange education data and materials with a first source education learning management system; exchanging education data and materials between the integrated system and the first system via the first component by use of the connector interface; determining capabilities of the first component for exchanging education data and materials by a query performed via the connector interface; and adjusting operations performed by the integrated system in response to a result of the query.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 3 is an exemplary user interface for integrating a source system, consistent with a disclosed embodiment;

FIGS. 4A and 4B illustrate another exemplary user interface for integrating a source system, consistent with a disclosed embodiment;

FIG. 9 is an exemplary user interface for an administrator to search and view user profiles, consistent with a disclosed embodiment;

DETAILED DESCRIPTION

Figure 1:
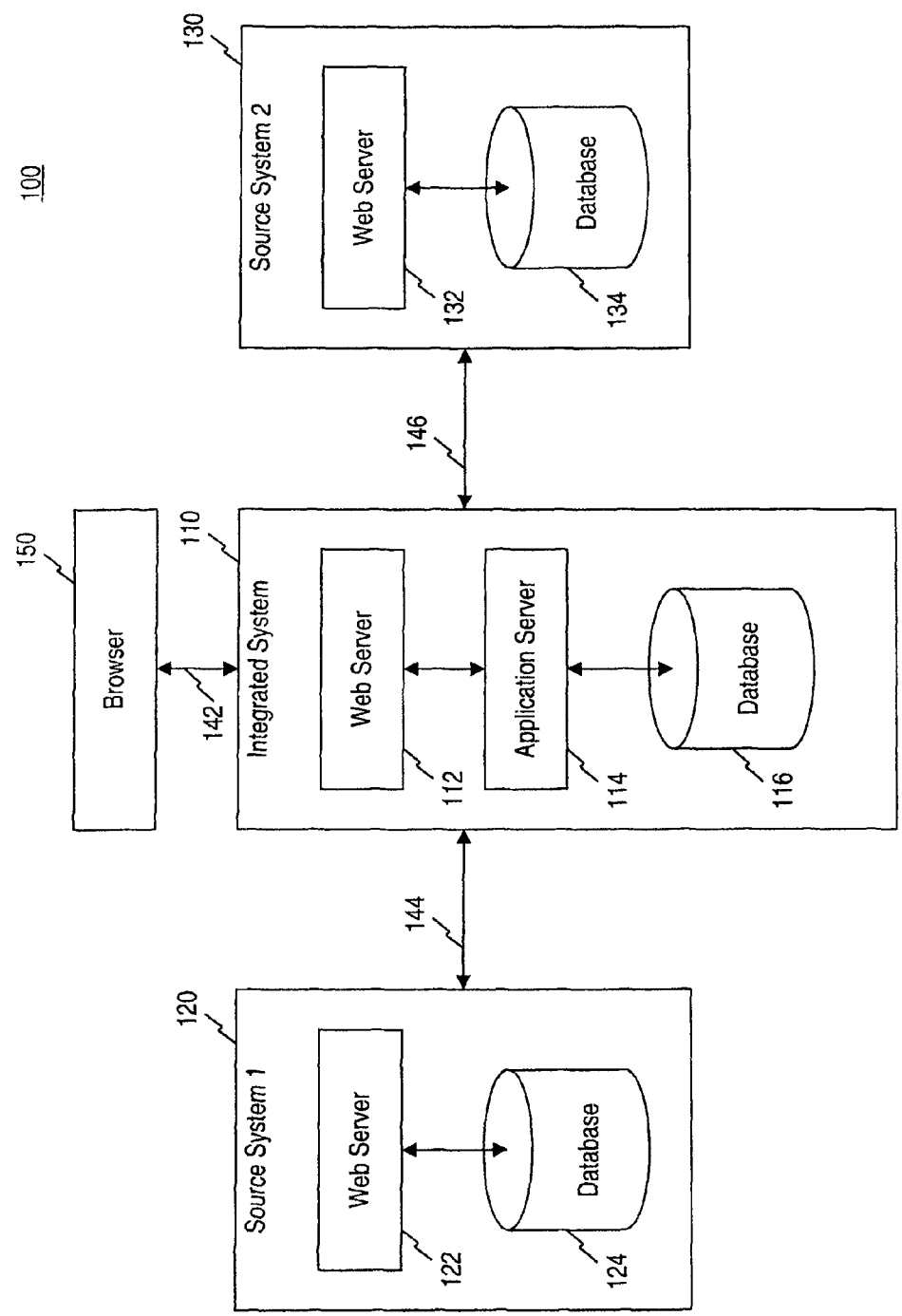
FIG. 1 is an exemplary system for integrating educational software modules, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods according to disclosed embodiments provide for integration of educational software modules from one or more source systems into an integrated or unified learning management system. A learning management system (LMS) is a software-based system that enables management and delivery of online or electronic educational materials to users. Functionality provided by a learning management system may include registering users, delivering educational materials, such as providing access to course materials and testing, discussion boards, blogs, RSS (Really Simple Syndication) feeds, emails, etc. Furthermore, a learning management system may provide tools for evaluating student performance. Learning management systems are typically based on various development platforms (e.g., Java, XML, Microsoft.Net framework) and may provide access to users via the Internet. Users may include students, teachers, and administrators. For example, a portal may allow a user to supply credentials (e.g., a username and password) and, after being authenticated, the user may navigate to courses, course materials, and other online function Furthermore, a learning management system often provides access control, provisioning of e-learning materials, communication tools, and administration of user groups. For example, a learning management system may provide functionality for teachers to manage courses and course materials, track student progress, provide content pages, discussion forums, chat, and create and/or modify online testing. For example, teachers may participate in discussions, conduct instruction, post and/or modify course materials, and maintain a grade book. Administrators may modify courses, course materials, course enrollments, and user accounts. Student users may access educational materials, activities, and store course work.

In this application, the term "source system" refers to a learning management system or software program that provides an electronic learning course. Examples of source systems include WebCT products, Blackboard Vista (a course management system), and Blackboard Campus Edition (a course management system). Source systems may also include other products provided by, for example, Blackboard Inc., other providers, or open source systems. The term "integrating" refers to incorporating, copying, or including data for courses, users, and/or enrollments from a source system to a unified system. In this application, the term "integrated system" refers to a learning management system in which educational software is being integrated from one or more source systems. Data for a course may include user data, role data specifying roles of the users in a particular course (or activity), enrollment data, other data concerning students (e.g., student groups), or other course data (e.g. announcements or grades).

During an integration process, educational materials that are used by the course may remain on a source system and might not be copied to the integrated system. That is, the software that provides the course (lectures, course materials, etc.) remains hosted by the source system. Typically data that is associated with the course may be stored in the source system. Alternatively, data that is subsequently generated by a course, such as grades, may be stored in the integrated system. After integration, the integrated data becomes available through the integrated system, but the course software itself is still hosted by the source system. Furthermore, the integrated system may provide its own course (i.e., a native course) that is fully hosted and provided (e.g., by an institution, application service provider, or other entity) from the integrated system. An example of an integrated system is the Blackboard Academic Suite, available from Blackboard Inc. Users of the Blackboard Academic Suite may, for example, access courses that are provided by a source system through the Blackboard Academic Suite. To the users, the integration provides a seamless educational experience, allowing the users to access courses provided by the source system through a central learning management system. Thus, to the user, it appears that they are accessing (and staying within) the integrated system, when in fact the integrated system provides access to and displays educational materials directly from a source system.

In one embodiment, the integrated system may provide a central educational site for users to access courses, materials, and other functionality. As a result, users are able to enjoy an educational experience in which they are able to attend all courses through one site, similar to attending a particular institution (e.g., a university). Furthermore, systems and methods disclosed herein may provide a common course and enrollment infrastructure for the management of courses/ sections for both courses from the integrated system and source systems. As a result, systems and methods disclosed herein may provide a consolidated course list and/or course catalog that includes courses from both the integrated system and one or more source systems. Users, including students, teachers, and administrators, may benefit from such consolidation. For example, administrators may access the integrated system to set up and manage courses and users. Moreover, the integrated system may provide shared resources (content, user tools, etc.) for courses provided by multiple source systems. Systems and methods consistent with the present invention may further provide consistent security protections for managing and protecting user privacy and user data across both courses from the integrated system and source systems. Furthermore, systems and methods disclosed herein may merge multiple user IDS at an institution in order to provide the same user experience for multiple IDS across the integrated system.

Users of the integrated system may access a consolidated course catalog, which may provide a listing of courses of one or more source systems and/or the integrated system. The course catalog may, therefore, allow users to access courses regardless of whether the courses are provided by a source system or an integrated system. For example, consistent with one embodiment, the integrated system can be a stand-alone integrated system that provides courses from one or more source systems. In another embodiment, the integrated system may provide its own courses (i.e., native courses) in addition to courses from one or more source systems.

In one embodiment, an integrated system may include a learning management system, a community and portal system, and a content management system. A learning management system may provide tools enabling teachers to generate course materials and content and may facilitate course instruction between teachers and students. A community and portal system may provide students and teachers with tools for interacting, such as discussion boards. A learning management system may provide management of electronic files (e.g., electronic documents, images, audio, video, and web content) that teachers and/or students may create, modify, and share. All of these activities may be related to courses from source systems and/or the integrated system.

Furthermore, the integrated system may include an evaluation system, which provides functionality for performing assessment of the effectiveness of an institution. Such functionality may be particularly useful in determining whether an institution should retain its accreditation. Alternatively, the evaluation system may reside outside of the integrated system. For example, the evaluation system may be provided by the same party as the integrated system or by a third party. An example of an evaluation system is disclosed in U.S. Patent Application Publication No. 2006/0259351 A1, published Nov. 16, 2006, entitled "Method and System for Assessment within a Multi-Level Organization," the disclosure of which is incorporated herein by reference. Due to the integration of courses from source systems to an integrated system, the integrated system may collect grades and other learning records and/or data from multiple source systems. Accordingly, from the integrated system, one may perform assessments of users, courses, departments, and an institution regardless of their origin.

Consistent with embodiments of the present invention, users (e.g., students, teachers, and administrators) of a source system and/or integrated system may have one or more roles. As the term is used herein, a "role" may indicate an access level of a user in a particular course or activity. For example, a role of a user may indicate whether the user is a student, teacher, alumni, or an administrator for a particular course or activity. An integrated system may use the roles of a user to determine what the user has access to in the context of a particular course or activity. When a course is integrated from a source system to an integrated system, data specifying the role of the users who are associated with the course and each user's role within that course may be included in the data received by the integrated system. Accordingly, roles may apply to the users in association with one or more courses that are provided by the source system and/or the integrated system.

The role of a user may depend upon a particular context. For example, a user may have a role of "student" in an advance biology course (e.g., Biology 401). That same user may have a different role in other courses. For example, that user may be a teaching assistant for an introductory biology course (e.g., Biology 101). Thus, in the introductory Biology course, the user may have a role of "teacher." Furthermore, a user may not only have different roles depending upon different contexts (e.g., such as a teacher in one course and a student in a different course), but may also have multiple roles in the same context. For example, a user might be both a student and a teaching assistant in the same course or a user might be both an alumni and a staff person at the same institution.

Systems and methods disclosed herein may provide access controls using role-based-access permissions for components of the integrated system and/or software modules from one or more source systems or other third party systems. For example, during integration of a course from a source system to an integrated system, the integrated system may receive role data indicating user access to the course. That is, the roles that are associated with a user may define access rights of that user. Returning to the prior example, a user with a student role in Biology 401 may access course materials, lectures, and tests for the purposes of reading and taking the tests. That user may not, however, create and/or edit course materials, lectures, and tests for Biology 401. However, because the user has a role of "teacher" for Biology 101, that user may create and/or edit course materials, lectures, and tests for Biology 101. Similarly, any other users that have a role of "teacher" for Biology 101 may create and/or edit course materials, lectures, and tests for Biology 101. One or more of those other users may also have a role of "teacher" for Biology 401 and, therefore, may create and/or edit course materials, lectures, and tests for Biology 401. A user may have a different role in each course that the user is associated with and, accordingly, may have multiple roles in an institution. Furthermore, the user may have a role for a course in the source system and a different (or the same role) for a course in the integrated system. For example, access rights may be granted to users based on their role in association with a course or activity. A user may access resources in an integrated system and/or other third party resources based on the user's role. For example, a user that has a role of student in a course provided by a source system may also access other activities and resources (e.g., a biology tutorial) that are provided by or associated with the integrated system based on the user's role. Likewise, a user's role in association with a course and a domain may be used to determine access rights within the integrated system and externally.

As the term is used herein, an "entity" is any course, user, activity, organization (e.g., a student group), program, etc. A "domain" is defined by one or more characteristics that are associated with a set of entities (e.g. users, roles, courses, activities). The concept of a domain is flexible to accommodate any desired relationship. For example, a domain can include a plurality of courses, the users that are associated with each of the courses, and the roles of each user in relationship to each course. Thus, a domain may be used to establish relationships between entities (e.g., users, courses, activities) and include the role of each user in a course, activity, or other grouping. As another example, a domain can include a plurality of student groups, the users that are associated with each of the groups, and the roles of each user in relationship to each group. Accordingly, the same user may have multiple roles in one domain. Furthermore, one or more administrators may be associated with a domain and may have one or more roles for the domain (e.g., an administrator that can modify the domain and/or the entities in the domain).

Consistent with disclosed embodiments, a source identifier may identify a source system for data that is being integrated with the integrated system. The integrated system may use the source identifier for domain mapping. Accordingly, a domain may be automatically created that aligns with a source identifier of a source system in order to maintain a relationship between a source and integrated system. The domain for a source system may include all (or a subset) of the courses, users, and roles of the users in that source system. When a domain is created, the administrator of the source system data may become the administrator of the domain in the integrated system. Alternatively, a new administrator may be assigned for the domain after the integration.

As an example, a domain may be created for all biology courses. Some of the biology courses may be provided by a source system and some of the biology courses may be provided by the integrated system. Alternatively, all of the biology courses may be provided by the source system or all of the biology courses may be provided by the integrated system. In the present example, a domain is created for all biology courses, two of which are provided by a source system (an introductory level course and an intermediate level course) and one of which that is provided by the integrated system (an advanced level course). The domain may include data for the courses (introductory, intermediate, and advanced) and data for each user associated with each course (i.e., the teachers and students). Furthermore, the domain may include role data for each user that specifies the user's role in the context of a specific course. Some of the users may be associated with more than one course. For example, the same user may teach two of the courses. That user may be assigned a role of teacher in the beginning level course and the intermediate level course, for example. Moreover, a user may be associated with more than one course, but may have a different role in each of the courses, as explained above.

Consistent with disclosed embodiments, domains may be created for any characteristic that is associated with a set of entities. As discussed above, a domain may be created for all courses of a particular subject (e.g., biology). As another example, a domain may be created for all freshman courses (e.g., all courses at the freshman level). For such a domain, the domain may include data for all freshman courses of all subjects, along with the users of each course. Furthermore, for each user, the domain may include the role of the user as it relates to a particular course. Accordingly, a user may appear in more than one domain. For example, a user that has a role of a student in one of the courses in the biology domain and who is also a freshman may appear in other freshman courses that are included in the domain for freshman courses. Moreover, a user's role in association with a course and/or a domain may be used to determine access rights within the integrated system as well as to determine access rights to resources that are external to the integrated system.

Domains may be created for other characteristics, such as for all student organizations at an institution. Such a domain may include all of the organizations, their associated users, and the roles of each user in the context of each organization. As another example, a domain may be created for all activities that are targeted to commuter students. Such a domain may include all of the activities for commuters, the users associated with those activities, and the roles of the users in the context of each activity. As further examples, domains may be created for other characteristics such as ages of users, financial aid status of users, housing locations of users, housing status of users (on campus or off campus), etc.

Domains may also include other domains. For example, a domain may be established for all introductory level biology courses, another domain for all intermediate level biology courses, and another domain for all advanced level biology courses. Accordingly, the introductory level biology course domain may include all course sections of introductory biology, along with the users that are associated with each course, and the roles of each user in the context of each course. Similarly, the intermediate level biology course domain may include all course sections of intermediate biology, along with the users that are associated with each course, and the roles of each user in the context of each course. In a similar respect, the advanced level biology course domain may include all course sections of advanced biology, along with the users that are associated with each course, and the roles of each user in the context of each course. Some users may be included in multiple domains (e.g., a user that is a teacher who teaches all course levels or a user that is a student in an advanced course and a teacher in a beginning level course). Furthermore, a domain may be created for all biology courses at an institution, which may thus include the three aforementioned domains (i.e., introductory level courses, intermediate level courses, and advanced level courses).

FIG. 1 is an exemplary system 100 for integrating educational software modules, consistent with a disclosed embodiment. As shown, system 100 comprises integrated system 110, connected to source system 120 and source system 130 via communication links 144 and 146. Furthermore, integrated system 110 is connected via data link 142 to a user terminal (not shown) executing browser 150. Although a specific numbers of source systems (i.e., source systems 120 and 130) are depicted in FIG. 1, any number of these systems may be provided. Communication links 142, 144, and 146 may include any number of components or links. Moreover, integrated system 110 may be connected to any number of terminals executing browser software.

A network (not shown) provides communications between the various devices in system 100 over communication links 142-146, such as integrated system 110, source system 120, and source system 130, and terminals (not shown) executing browser software (e.g., browser 150). In addition, integrated system 110 may access other legacy systems (not shown) via the network, or may directly access legacy systems, databases, or other network applications, Legacy systems may include any additional source systems or other third party systems that have communications with, or may be accessed by users of, integrated system 110. The network may be a shared, public, or private network, may encompass a wide area or local area, and may be implemented through any suitable combination of wired and/or wireless communication networks. Furthermore, the network may comprise a local area network (LAN), a wide area network (WAN), an intranet, or the Internet.

Integrated system 110 may comprise a web server 112, an application server 114, and a database 116. Although integrated system 110 depicts web server 112, application server 114, and database 116 as separate components, these components may be combined. Any appropriate storage device may be substituted for database 116. Furthermore, components of integrated system 110 may distribute data for parallel processing by one or more additional servers (not shown). Web server 112 and application server 114 may also be implemented in a distributed network. Alternatively, web server 112 and application server 114 may be specially constructed for carrying-out methods consistent with disclosed embodiments.

Web server 112 may comprise a computer (e.g., a personal computer, network computer, server, or mainframe computer) having one or more processors (not shown) that may be selectively activated or reconfigured by a computer program. Web server 112 may provide functionality for authenticating users of integrated system 112 and transmitting content to users. Content may include (streaming) video, audio, text, or image data, including, for example, XML files, HTML files, etc. For example, web server 112 may host one or more computer programs for providing users access to a learning management system. Furthermore, web server 112 may provide content retrieved from database 116 over the network to users.

Application server 114 may comprise a computer (e.g., a personal computer, network computer, server, or mainframe computer) having one or more processors (not shown) that may be selectively activated or reconfigured by a computer program. Application server 114 may run computer programs and enable applications to communicate with web server 112. For example, application server 114 may store one or more software modules for providing a learning management system and may enable applications to communicate with web server 112. Furthermore, application server 113 may access content stored in database 116 and provide that content to web server 112 for transmission to users.

Database 116 may store data records for courses, user records, files, educational materials, etc. Furthermore, although one database is shown in FIG. 1, application server 114 may interface with additional databases. Database 116 may receive data from the network. Although shown as separate components in FIG. 1, web server 112, application server 114, and database 116 may be combined. Furthermore, any one of web server 112, application server 114, and database 116 may exchange data directly or via the network.

Browser 150 may be executed by any kind of terminal, such as any device that can communicate with integrated system 110. For example, terminals capable of executing browser 150 may be personal computers, handheld devices, or any other appropriate computing platform or device capable of exchanging data with the network. Terminals may each include a processor (not shown) and a memory (not shown). Furthermore, terminals may execute program modules that provide one or more graphical user interfaces (GUIs) for interacting with network resources (e.g., generating browser 150) and/or accessing integrated system 110.

Source systems 120 and 130 may include web servers 122 and 132, respectively, and databases 124 and 134, respectively. For example, web server 122 of source system 120 may directly interface with user terminals (not shown) or may interface with integrated system 110 over data link 144. Furthermore, source system 120 may store data for courses in database 124. Although not shown, source systems 120 and 130 may each include an application server and, accordingly, be similar or identical in construction to integrated system 110. In one embodiment, a course provided by source system 120, which has been integrated into integrated system 110, may execute through integrated system 110. In a similar fashion, source system 130 may store data (e.g., lectures, course materials, etc.) for courses in database 134 and web server 132 may directly interface with user terminals (not shown) or may interface with integrated system 110 over data link 146.

Source systems 120 and 130, and integrated system 110 are configured such that users (e.g., students, teachers, administrators) continue to use their existing learning systems. As a result, users continue to use functionality for courses and experience educational materials in a familiar fashion. Visually, users may be welcomed into integrated system 110 and have access to courses provided by source system 120 and/or source system 130 within, for example, a user interface that is generated by integrated system 110. For example, data identifying courses, as well as user data, role data, and/or enrollment data may be integrated into integrated system 110. However, software that provides the course (e.g., lectures, course materials, etc.) remains on source system 120 and/or source system 130 and is not integrated into integrated system 110. User interfaces for managing an integration and allowing access to courses that have been integrated are discussed below in further detail in connection with FIGS. 3-10. Accordingly, integrated system 110 may provide access to courses maintained on source system 120 and/or 130. Integrated system 110 may further provide access to native courses that are stored in integrated system 110.

Figure 2:
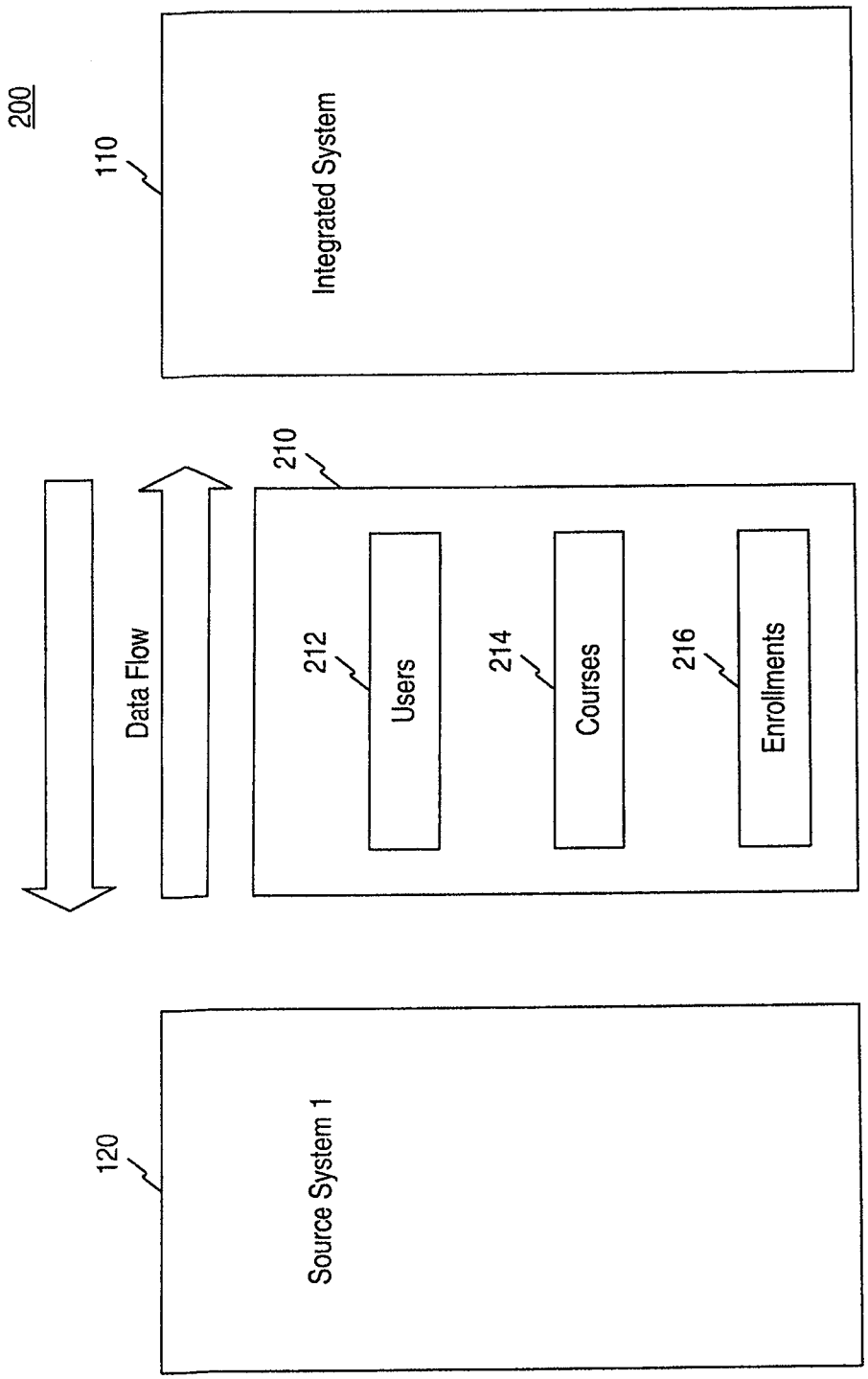
FIG. 2 is an exemplary diagram showing data flow in the system of FIG. 1, consistent with a disclosed embodiment.

FIG. 2 is an exemplary diagram 200 showing data flow in the system of FIG. 1, consistent with a disclosed embodiment. In particular, diagram 200 shows a flow of data 210 from source system 120 to integrated system 110 during an integration process. Integrated system 110 may also send data to source system 120. Integrated system 110 may also integrate data from one or more additional source systems (e.g. source system 130, etc.). Furthermore, administrators may have discretion as to how an integration is performed. For example, administrators may select whether to integrate a course once or to keep the integration dynamically updated according to a schedule. As another example, administrators may select whether changes within integrated system 110 automatically propagate back to source systems 120 and 130 and/or whether changes to source systems 120 and 130 automatically propagate to integrated system 110. Accordingly, administrators may select whether an integrated system or a source system is considered the master system as to data changes.

Furthermore, in other embodiments, data may be obtained from a source system for use by integrated system 110 as needed or during an integration. Some data may continue to reside on the source system, for example, or may reside on both the source system and integrated system 110. Additionally, in some embodiments, integrated system 110 may transmit or "push" data to a source system in order to, for example, provide updated information to the source system.

During an integration process, data 210 is received by integrated system 110 from source system 120. Furthermore, integrated system 110 may store data 210 in database 116. For example, an application executing on, for example, application server 114, may allow an administrator to configure an integration process. Subsequent to the integration, the integrated course is accessible to users via integrated system 110 as if the course is being provided by integrated system 110. However, the actual course application for the course remains stored in source system 120. Accordingly, changes made to the course at source system 120 do not need to be provided to integrated system 110. Furthermore, browser 150 may be redirected to source system 120 to obtain the course for inclusion in a frameset displayed on a user interface, as discussed below in further detail.

Data 210 may include user data 212, course data 214, and enrollment data 216. User data 212 may include data pertaining to users of a course provided by a source system. For example, user data 212 may include username, first name, last name, password, gender, birthday, e-mail address, home phone number, fax number, mobile phone number, street address, city, state, ZIP code, country. Course data 214 may include data pertaining to a particular course being provided by source system 120. For example, metadata for a course may indicate the course ID, course name, description, instructor, meeting times and/or dates. Enrollment data 216 may identify users enrolled in a particular course. For example, enrollment data 216 may specify the first and last names and usernames included in user data 212. Enrollment data 216 may further include other information related to the user's enrollment in a course, such as assignments and grades.

User data 212 may also include role data for one or more of the users in the context of the course that is being integrated. As discussed above, a role of a user may indicate whether the user is a student, teacher, alumni, administrator, or any other role for a particular course or activity. Integrated system 110 may use the role of a user to determine user access in the context of the course that is being integrated. In other implementations, a role may indicate user access in the context of an activity. For example, a user with an administrator role for a particular domain may modify or remove a course from the domain in the integrated system 110.

As an example, during an integration, integrated system 110 receives data 210 from source system 120 for an introductory level biology course. In this example, data 210 may include course data 214, which identifies the introductory biology course (e.g., metadata for the course name, instructor, meeting times and/or dates). Enrollment data 216 may identify users enrolled in the introductory biology course. User data 212 may include information for users of the course (e.g., data identifying teachers and students). Furthermore, role data may indicate the role of the users in the introductory biology course. For example, one of the users of the introductory biology course may have a role of "student" in the course. That same user may have a different role in other courses that are provided by the integrated system 110 or in other courses that are provided by the same or other source systems. For example, that same user may have a role of a teacher in other courses. Furthermore, another user of the introductory biology course may have a role of a teacher in this course. Integrated system 110 may use the role data of a user to determine user access in the introductory biology course integrated from source system 120. Moreover, integrated system 110 may use the role data of the user to determine access rights of the user to other resources/tools that are provided by integrated system 110 or any other system, including third party systems, which are external to integrated system 110. Thus, a user with a student role in the introductory biology course may access course materials, lectures, and tests for the purposes of reading and taking the tests. That user may not, however, create and/or edit course materials, lectures, and tests for this course. By contrast, a user that has a role of "teacher" for the course may create and/or edit course materials, lectures, and tests for the course. Moreover, the user's role may determine the user's access rights in integrated system 110 and/or other third party resources. For example, a user that has a role of student in the introductory biology course may access the course that is provided via source system 120. Furthermore, that user, based on the user's role as a student, may also access a biology tutorial provided by integrated system 110.

During the integration, integrated system 110 may receive or create a source identifier that identifies source system 120. Integrated system 110 may use the source identifier to create a domain for source system 120. For example, the domain for source system 120 may include data that represents all of the courses, the users that are associated with each of the courses, and the roles of each user in each of the courses. The administrator assigned to that domain in source system 120 may become the administrator of the domain in integrated system 110. Alternatively, a new administrator may be assigned for the domain once the domain has been integrated into integrated system 110. Domains may be created for courses and/or activities related to source system 120, as well as may be created for courses and/or activities that are related to both source system 120 and integrated system 110. The creation of domains after an integration is discussed below in further detail.

FIG. 3 is an exemplary user interface 300 for integrating a source system, consistent with a disclosed embodiment. For example, a system administrator can integrate a course from a source system (e.g., source system 120 and/or source system 130) by selecting a link in an interface (not shown) that is provided by integrated system 110. A configuration interface, such as user interface 300, may include options for selection by an administrator, such as whether to enable an integration process. User interface 300 may allow an administrator to specify an address, such as a uniform resource locator (URL), of a source system from which a course is being integrated. During the integration, data 210, as discussed above in connection with FIG. 2, may be integrated from a source system into integrated system 110.

Figure 4A:
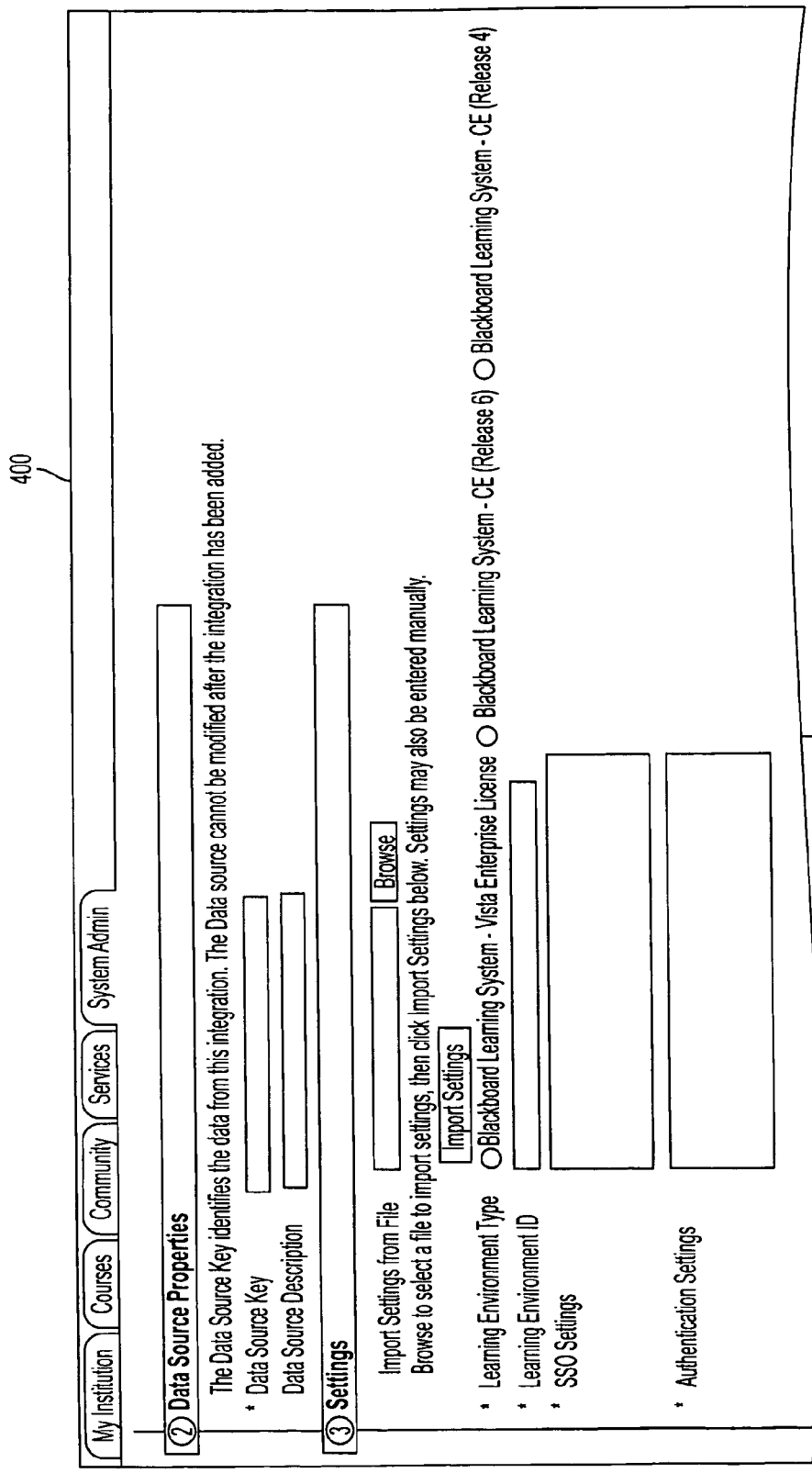

FIGS. 4A and 4B illustrate another exemplary user interface 400 for integrating a source system into an integrated system, consistent with a disclosed embodiment. User interface 400 may allow an administrator to specify a "data source key" to identify data from a particular integration. The data source key may be any unique identifier that specifies a source system, such as any alphanumeric identifier. Accordingly, data that is copied to integrated system 110 may be identified as having originated from source system 120, for example, based on the data source key. Through user interface 400, an administrator may set import settings, such as indicating a type of learning system corresponding to a course maintained by a source system. User interface 400 may provide conflict resolution options. For example, an administrator may specify whether to change the data coming from source system 120 so that it does not collide with unique identifiers from other source systems or the integrated system.

Moreover, the data source key may be used to automatically create a domain for the source system. For example, integrated system 110 may create a domain for the source system in order to maintain a relationship between a source and integrated system. The domain may include all of the courses, users, and roles of the users in each course that is being integrated into integrated system 110. When a domain is created for a source system, the administrator of the data in the source system may become the administrator of the domain in the integrated system. Alternatively, a new administrator may be assigned for the domain after the integrated takes place.

Figure 5:
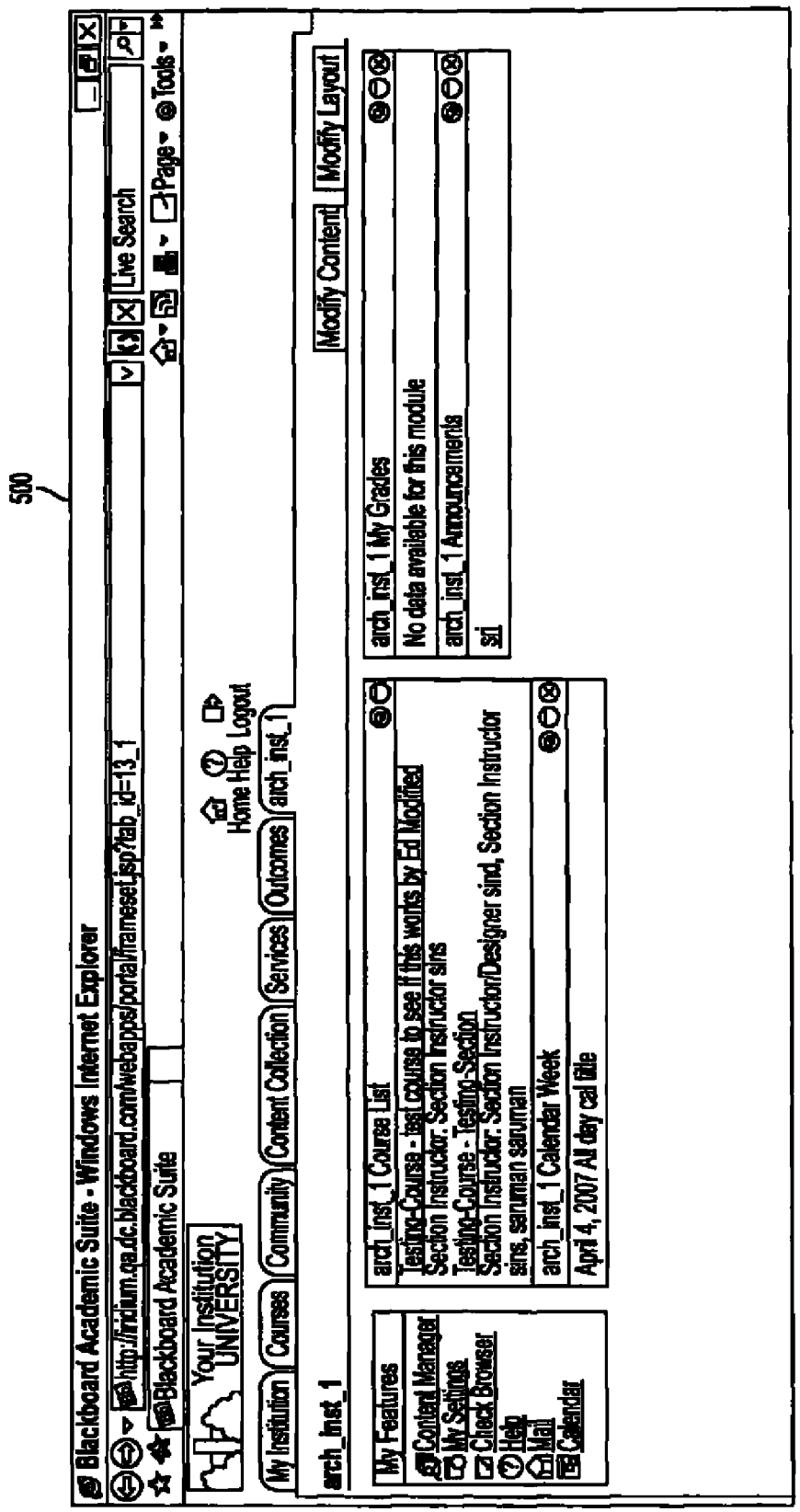
FIG. 5 is an exemplary user interface for accessing an integrated system, consistent with a disclosed embodiment.

FIG. 5 is an exemplary user interface 500 for accessing an integrated system, consistent with a disclosed embodiment. User interface 500 allows an administrator to view the results of an integration process and to test links to a course. Furthermore, an administrator may test links to grades or other features. Through the "My Features" options, the administrator may access additional options (e.g., Content Manager, My Settings, Check Browser, Help, Mail, and Calendar). Using the tabs found on user interface 500, the administrator may select other options (e.g., My Institution, Courses, Community, Collection, Services, and Outcomes).

Figure 6:
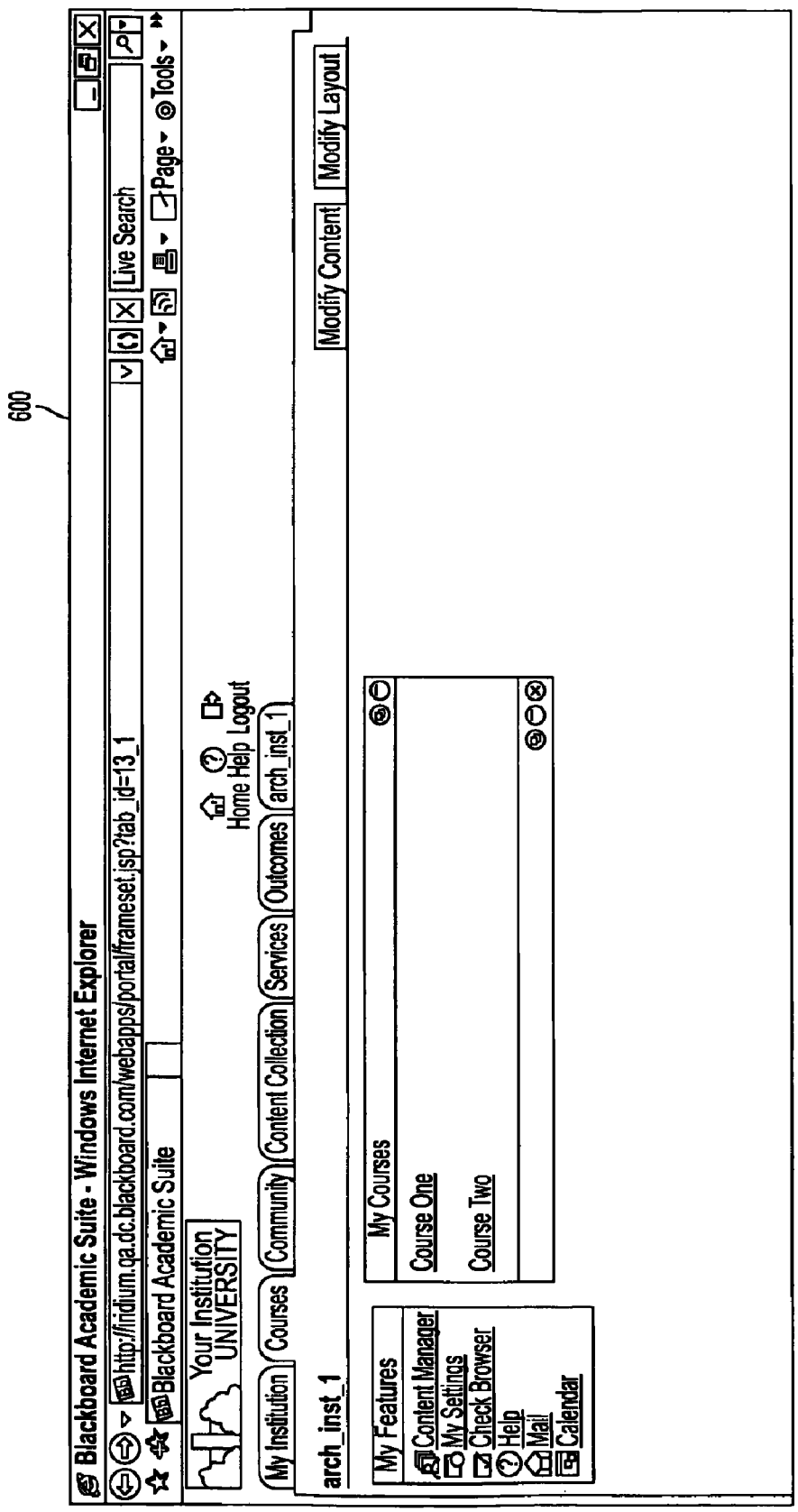
FIG. 6 is an exemplary user interface for selecting a course in an integrated-system, consistent with a disclosed embodiment.

FIG. 6 is an exemplary user interface 600 for selecting a course in an integrated system, consistent with a disclosed embodiment. For example, integrated system 110 may display user interface 600 to a student user. User interface 600 may include a logo or name of an institution (e.g., Your Institution University) of the student user. Logos, images, text, or other information and tools for users may be tailored to the user based on information that was received during the integration process. In an integrated experience, new integrations may establish access to a course on a dedicated "Course" tab. For example, as shown in FIG. 6, the "Courses" tab is selected. From user interface 600, a student user may select functionality specific to a course provided by a source system (e.g., Course One or Course Two). By selecting, such as by clicking on the course name (e.g. Course One), the authenticated user obtains access to the course. That is, for example, the course content is received from a source system by integrated system 110, which displays the course content in a frame, as discussed below in connection with FIG. 7 in greater detail.

The integrated system provides the ability to simultaneously view announcements, calendar information, and grades, for example, from multiple learning management systems in a single screen, providing an integrated experience despite the diversity of the constituent systems.

Figure 7:
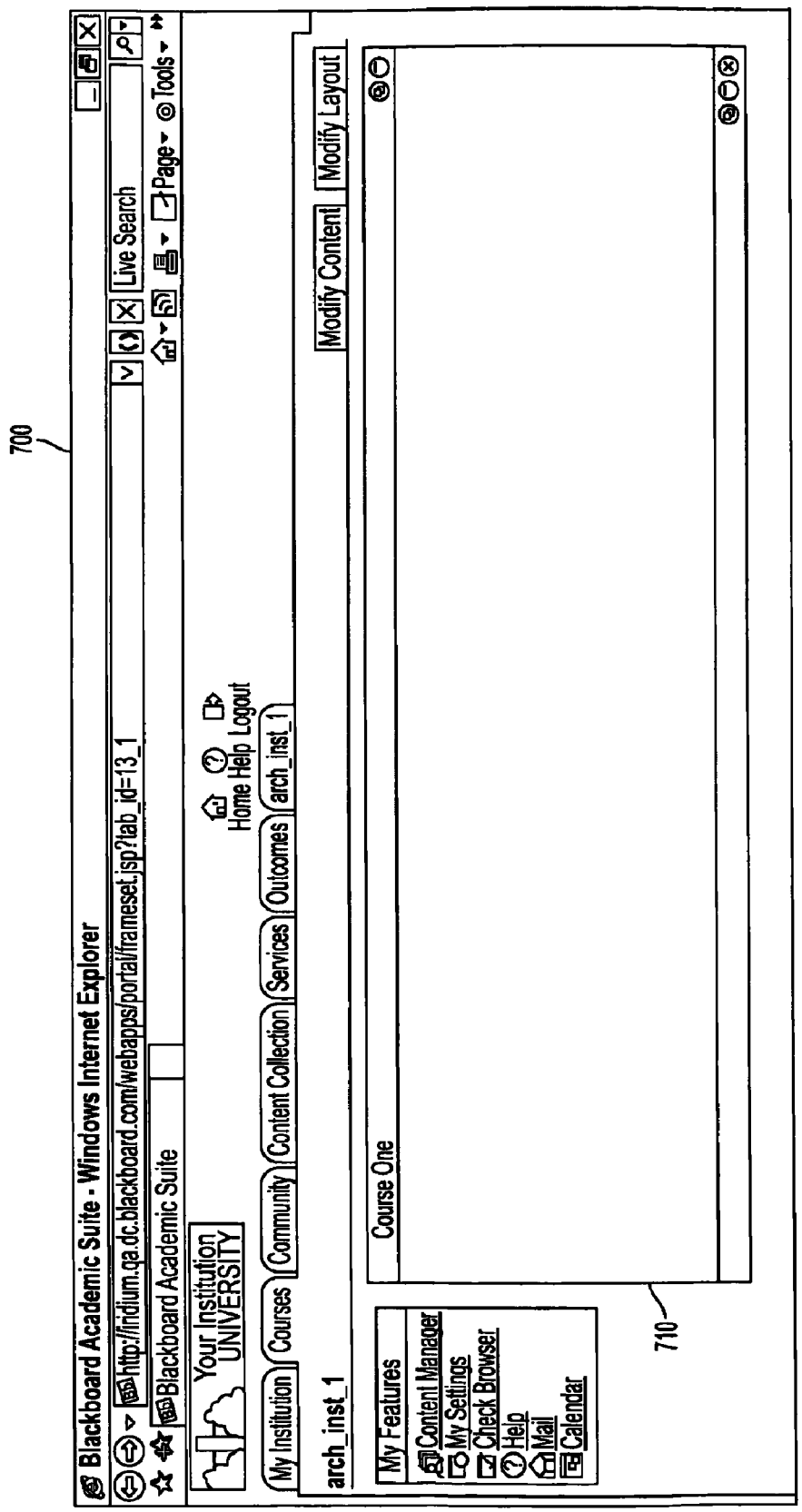
FIG. 7 is an exemplary user interface for a course from a source system that is embedded in a frame displayed by an integrated system, consistent with a disclosed embodiment.

FIG. 7 is an exemplary user interface 700 of a course from a source system (e.g., source system 120 or source system 130) embedded in a frame 710 displayed by integrated system 110, consistent with a disclosed embodiment. For example, frame 710 may display course content for Course One.

By presenting the source system in a frame 710, a user can access a source system using the original interface of the source system, but also have available a sidebar 720 on the display for ready access to information and features provided by the integrated system.

Furthermore, any user who is enrolled in courses/sections can access grades in a "My Grades" system tool from all of the courses/sections that the user has access to. Any user can manage their personal information settings from a single point inside the integrated system (e.g., through the "My Features" options). Priority settings such as Locale, Privacy, and Password can be changed inside integrated system 110 and other settings will apply to a respective source system.

Figure 8A:
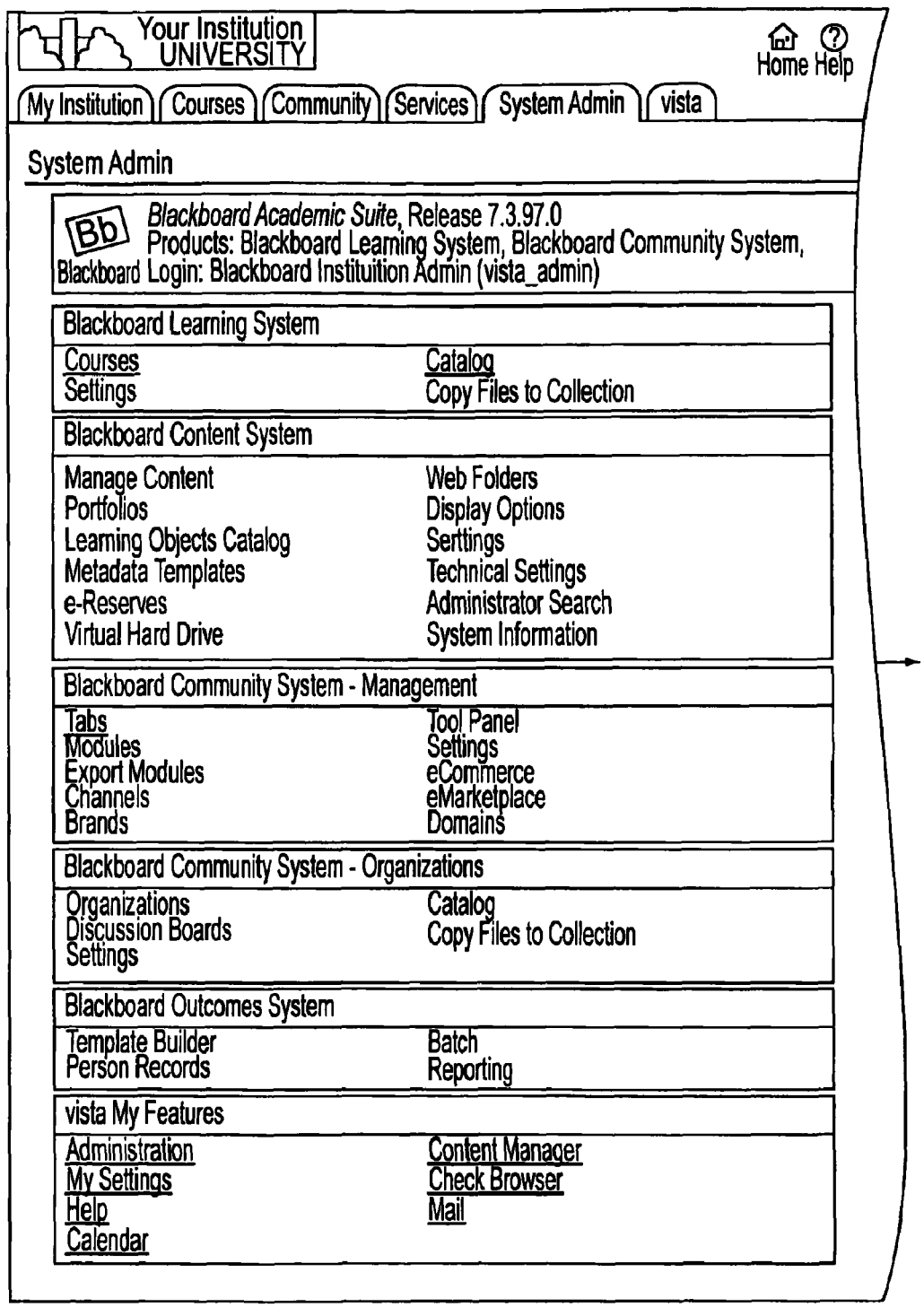
FIGS. 8A and 8B illustrate an exemplary user interface for an administrator to manage an integrated system, consistent with a disclosed embodiment.
Figure 8B:
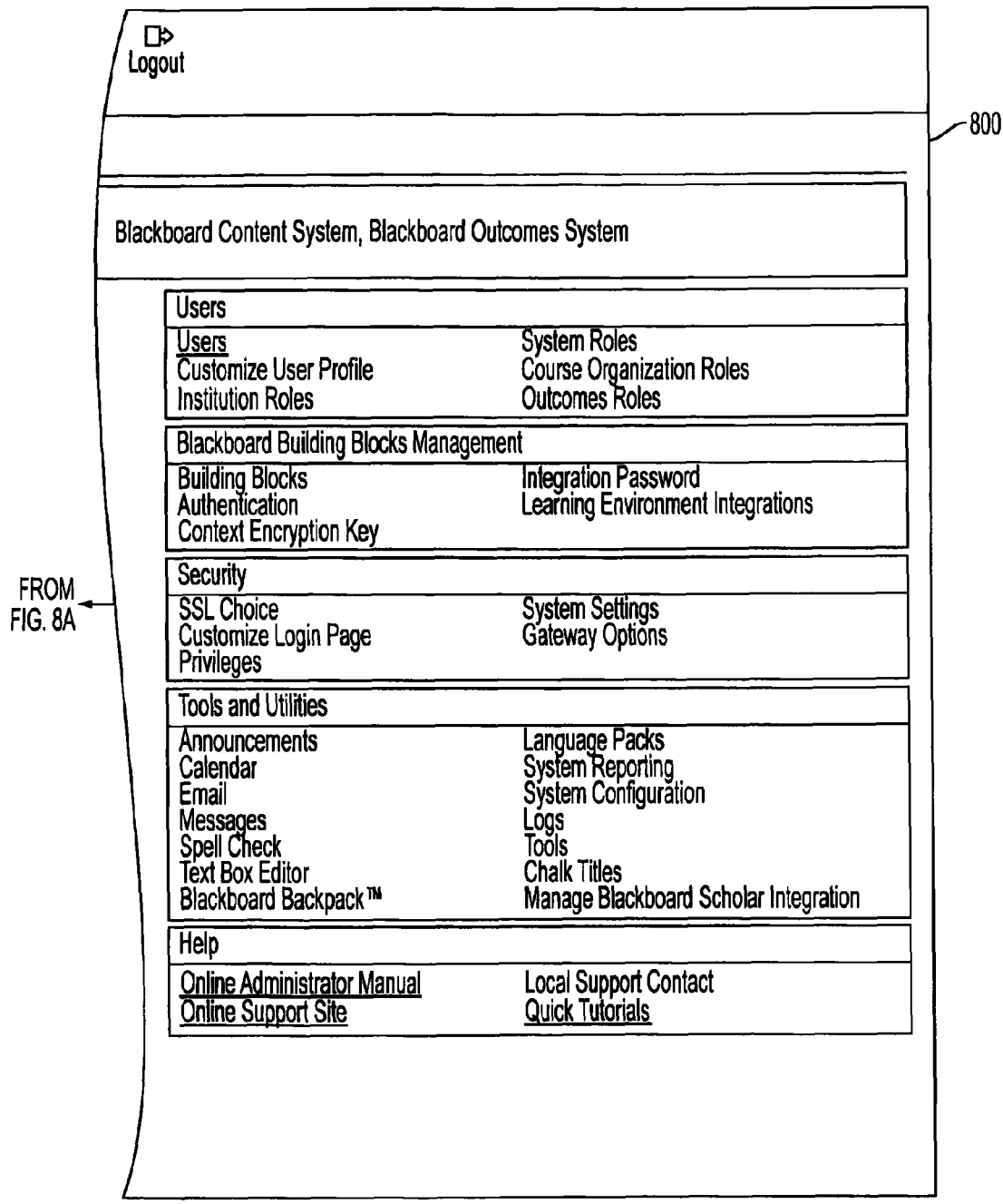

FIGS. 8A and 8B illustrate an exemplary user interface 800 for an administrator to manage an integrated system, consistent with a disclosed embodiment. For example, an administrator may reach user interface 800 by selecting a "System Admin" tab. User interface 800 may provide administrators with access to learning system, content system, and community system functionality. Administrators may access user profiles, adjust security settings, access tools and utilities, and access help functionality.

For example, administrator users who can manage users are able to add, modify, and remove users. Access to this functionality may be controlled by domains, as is described in detail below. Administrator users who can manage courses/sections are able to access courses/sections for both integrated system 110 and source systems. Administrator users can access, add, modify, and remove both integrated system 110 and source system courses/sections, enrollments, and users. As a result, via integrated system 110, administrators may access a consolidated course list and/or course catalog that includes courses from both integrated system 110 and one or more source systems. For example, course metadata may include data that is translated into new uses in integrated system 110, such as course categories that are integrated from source system 120 or 130 and that are used to generate the course catalog in integrated system 110.

FIG. 9 is an exemplary user interface 900 for an administrator to search and view user profiles, consistent with a disclosed embodiment. User interface 900 may provide functionality for an administrator to search user profiles by username or other fields, such as email address or source system, for example. As shown in the "Learning Environment" column 910, user interface 900 identifies that certain records originated from other source systems (e.g., Vista).

Figure 10A:
FIGS. 10A and 10B illustrate an exemplary user interface for an administrator to edit a user profile, consistent with a disclosed embodiment.
Figure 10B:
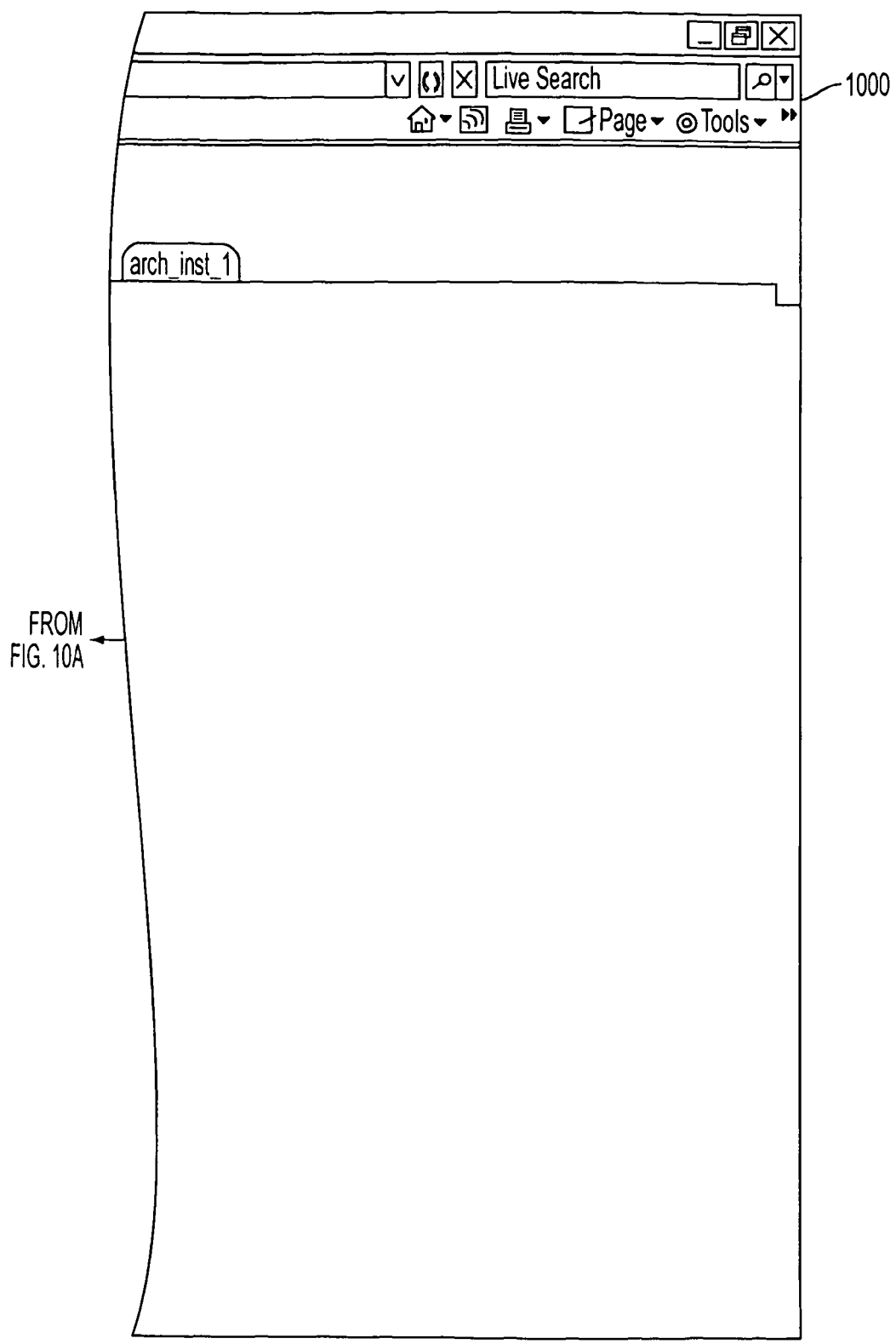

FIGS. 10A and 10B illustrate an exemplary user interface 1000 for an administrator to edit a user profile, consistent with a disclosed embodiment. For example, an administrator may reach user interface 1000 by selecting "Users" from user interface 800. An administrator may access, create, or change a username, first name, last name, other name, name prefix, name suffix, password, and e-mail address, etc. Furthermore, an administrator may specify a data source, a source identifier, and a source ID identifier. The data source may indicate a name of a source system. The source identifier is an identifier that may indicate the source system (and may be the same or different from the data source). The source ID identifier may indicate the username of the user in the source system.

Figure 11:
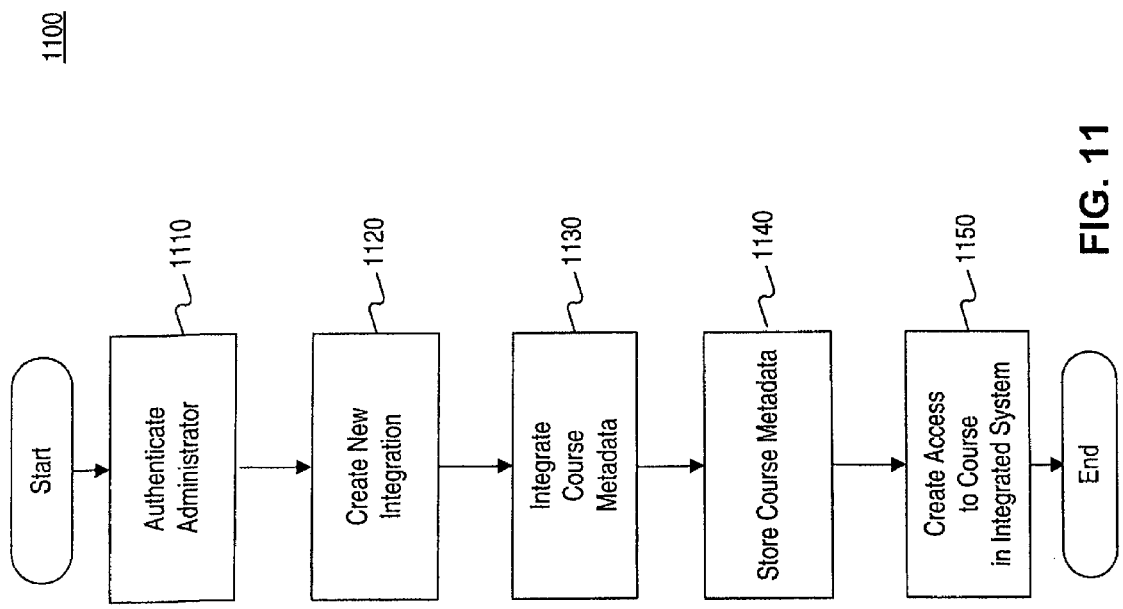
FIG. 11 is an exemplary flow diagram of a method for integrating data from a source system, consistent with a disclosed embodiment.

FIG. 11 is an exemplary flow diagram 1100 of a method for integrating data from source system 120 or 130, consistent with a disclosed embodiment. Flow diagram 110 may implement processes according to one or more program modules stored by application server 114.

In step 1110, integrated system 110 may authenticate an administrator. For example, the administrator may submit credentials (e.g., a username and password) for authentication through browser 150. Once authenticated, browser 150 may navigate to a user interface providing selectable options.

In step 1120, the administrator may select an option to create a new integration-or integrate a new set of courses. For example, from a user interface, the administrator may select an option to create a new integration and browser 150 may navigate to one or more user interfaces for selecting parameters of the integration (e.g., user interface 300 and/or 400). User interface 300 facilitates the integration process. Furthermore, user interface 300 may allow an administrator to specify an address, such as a uniform resource locator (URL), of a source system from which a course is being integrated. User interface 400 may allow an administrator to specify a data source key in order to identify data from a particular integration. The data source key may be any unique identifier. Accordingly, data that is copied to integrated system 110 may be identified as having originated from source system 120, for example, based on the data source key. Furthermore, the data source key may be used to automatically create a domain for the source system. For example, integrated system 110 may create a domain that includes all of the courses, users, and roles of the users in each course that is being integrated into integrated system 110. Through user interface 400, an administrator may set import settings, such as indicating a type of learning system corresponding to a course maintained by a source system. Furthermore, user interface 400 may provide conflict resolution options.

In step 1130, integrated system 110 may integrate course metadata from a source system (e.g., source system 120 or 130). As discussed in connection with FIG. 2, during an integration process, data for a course (e.g., data 210) may include user data 212, course data 214, and enrollment data 216. User data 212 may include data pertaining to users of a course provided by the source system, including role data for users that indicates a role of each user in the context of a particular course or activity. Course data 214 may include data pertaining to a particular course being provided by source system 120. Enrollment data 216 may identify users enrolled in a particular course.

In step 1140, integrated course metadata from the source system may be stored in database 116 of integrated system 110. Furthermore, database 116 may associate the integrated course metadata with location information specifying the location of the course. Location information may include, for example, an Internet address, such as a uniform resource locator (URL). Accordingly, course metadata (e.g., data 210) is integrated into integrated system 110.

In step 1150, integrated system 110 may create access to the course in integrated system 110. For example, integrated system 110 may store in web server 112 a file (e.g., a document or a webpage) that may be displayed in a portion of an interface (e.g., a frame, such as frame 710) of a user interface that is generated by integrated system 110. A browser may be redirected to the source system (e.g., source system 120 or 130) to obtain the course for inclusion in a page displayed on a user interface. Accordingly, the browser may automatically access the source system and display the course.

Figure 12:
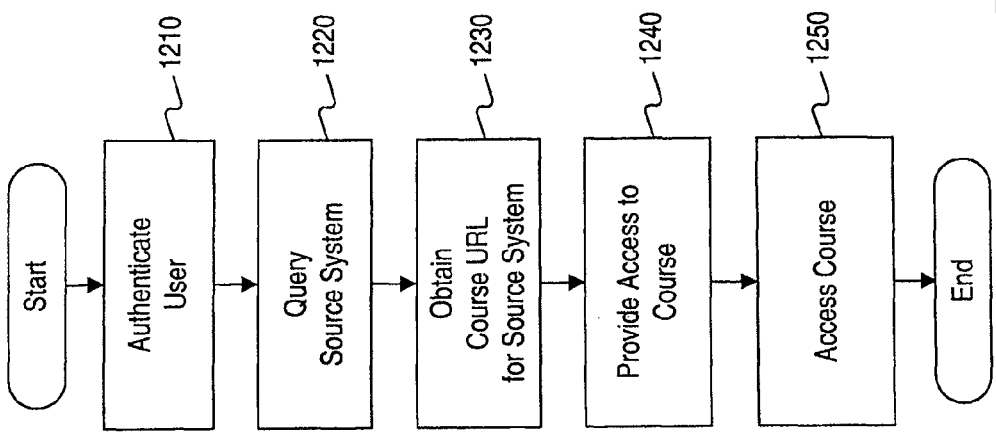
FIG. 12 is an exemplary flow diagram of a method for accessing an integrated course provided by a source system, consistent with a disclosed embodiment.

FIG. 12 is an exemplary flow diagram 1200 of a method for accessing an integrated course provided by a source system, consistent with a disclosed embodiment. In step 1210, integrated system 110 may authenticate a user, such as student or a teacher. For example, the user may submit credentials (e.g., a username and password) for authentication through browser 150. Once authenticated, the user may use browser 150 to navigate to a user interface providing selectable options. The user interface (e.g., user interface 600) may include a logo or name of an institution (e.g., your University) as well as other information and activities tailored to the user's specific learning needs. The user may select a course provided by a source system (e.g., Course One or Course Two, as shown in user interface 600). In this example, Course One is selected by the user and may be maintained by source system 120.

In step 1220, integrated system 110 may query source system 120. The query may include appropriate credentials identifying the user for authentication by source system 120. Furthermore, the query may request an address (e.g., URL) for launching the course in browser 150.

In step 1230, integrated system 110 may receive the address for the course from source system 130. Next, in step 1240, integrated system 110 may provide access to the course. For example, integrated system 110 may load, in a portion of a display (e.g., a frame) generated by browser 150, data that is received from the address. The data received from the address may include a course and associated educational materials. In step 1250, a user at browser 150 may access the course via, for example, a frame displayed in a user interface generated by integrated system 110 (e.g., frame 710 may display educational materials for Course One, as shown in FIG. 7).

Figure 13:
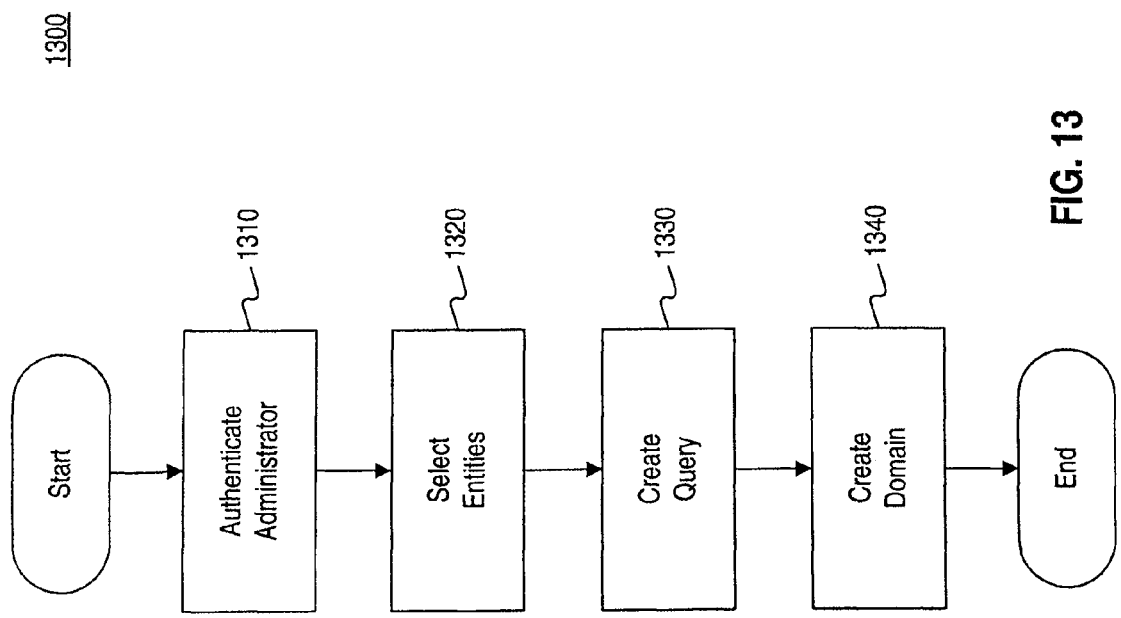
FIG. 13 is an exemplary flow diagram of a method for creating a domain for entities in an integrated system, consistent with a disclosed embodiment.

FIG. 13 is an exemplary flow diagram 1300 of a method for creating a domain for entities in an integrated system, consistent with a disclosed embodiment. As discussed above, a domain may be automatically created for a source system during an integration. Furthermore, a domain may be manually created based on criteria specified by a user, such as an administrator.

As also discussed above, users may have different roles for different domains. For example, a user may have an administrator role for a first domain (e.g., a course and enrollments from source system 120), but might not have an administrator role for another domain (e.g., a course and enrollments from source system 130). Furthermore, users may be included in a plurality of domains. Embodiments of the present invention may establish domains for an entire source system, for a single course, for a grouping of courses, for a grouping of activities, or for other groupings. For example, domains may be based on departments, a group of courses, course level, or groups of users (e.g., a domain for all freshmen, a domain for all students receiving financial aid, etc.). If a domain is created that includes all of the courses from a particular source system, an administrator can be automatically or manually set up to be the manager of that domain. The source system could represent an institution, for example, or multiple source systems may be integrated for use by one institution. As discussed above, domains may be created for other characteristics and domains may also include other domains.

Referring now to FIG. 13, in step 1310, integrated system 110 may authenticate an administrator. For example, the administrator may submit credentials (e.g., a username and password) for authentication through browser 150. Once authenticated, browser 150 may navigate to a user interface providing selectable options. The administrator may select an option to access, create, or edit domains. For example, administrators who are domain administrators may manage domain-defined subsets of courses regardless of whether those courses are provided by integrated system 110 or source systems 120 and 130.

In step 1320, integrated system 110 may receive a selection of entities from the administrator for the domain. As an example, a domain may be created for all biology courses, two of which are provided by a source system (an introductory level course and an intermediate level course) and one of which that is provided by integrated system 110 (an advanced level course). The domain includes data for the courses (introductory, intermediate, and advanced) and data for each user associated with each course (i.e., the teachers and students). Furthermore, the domain includes role data for each user that specifies the user's role in the context of a specific course.

In step 1330, integrated system 110 may create a query for the entities selected by the administrator. For example, integrated system 110 may access database 116 and determine which courses are introductory biology courses. The courses may be provided by a source system and/or may be native courses to integrated system 110. Integrated system 110 may query, for example, database 116. Furthermore, integrated system 110 may retrieve metadata for all courses that are introductory biology, along with associated metadata for the courses, including the users associated with each of the courses and the roles of each of the users in each course.

Next, in step 1340, integrated system 110 may create a domain in database 116 associating the metadata that was received from the query with the domain.

Administrators may also modify domains. Furthermore, when students are no longer enrolled in a course, any domain containing that course may be automatically updated. Further still, integrated system 110 may automatically create a domain in integrated system 110 during the integration of a course from source system 120 or 130. For example, during integration of the course, a domain may be established in integrated system 110 for all students that are enrolled in a course provided by source system 120.

Figure 14:
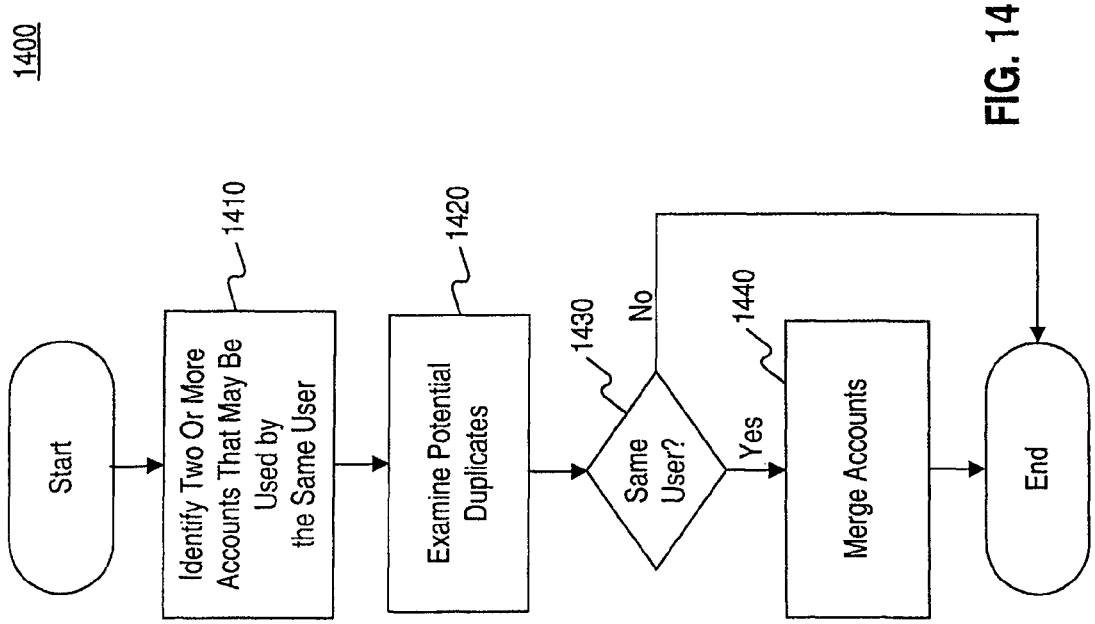
FIG. 14 is an exemplary flow diagram of a method for merging user accounts in an integrated system, consistent with a disclosed embodiment.

FIG. 14 is an exemplary flow diagram 1400 of a method for merging user accounts in an integrated system, consistent with a disclosed embodiment.

In step 1410, integrated system 110 may identify two or more accounts that may be use by the same user. For example, integrated system 110 may, via application server 114, execute a tool for comparing usernames stored in database 116 against each other. For example, integrated system 110 may launch the tool following an integration process in order to determine whether any usernames from the integration appear to already have existing accounts in integrated system 110.

In step 1420, integrated system 110 may examine potential duplicates. For example, the tool discussed above may implement a process to compare certain data associated with accounts having the same or similar usernames (e.g., comparing social security numbers, student ID numbers, etc.). Alternatively, an administrator of integrated system 110 may perform a manual examination of potential duplicates.

In step 1430, integrated system 110 may make a determination that at least two accounts pertain to the same individual. Alternatively, an administrator of integrated system 110 may make the determination. Furthermore, in this step, integrated system 110 may send a notification (e.g., email) to the users of the accounts requesting confirmation that the accounts do in fact pertain to the same individual.

In step 1440, integrated system may merge the accounts. For example, data for one account may be merged with data for another and the username for one of the accounts may be deactivated.

Although the above disclosure describes providing a bridge for integrating legacy source systems 112 and 114 with an integrated system 110 to provide a consistent experience for administrative and end users, regardless of where a given course is hosted, further benefits can be obtained by exchanging a broader range of information via a well-defined connector application programming interface (API). Where the connector API is sufficiently broad, it can ease, and automate significant portions of, the migration of users and courses from a legacy source system to the integrated system. As described in further detail below, use of the connector API allows for a granular approach to migration, providing for the migration and conversion of educational materials for native hosting on integrated system 110 on a course-by-course basis, while maintaining the benefits of integration described above.

Figure 15:
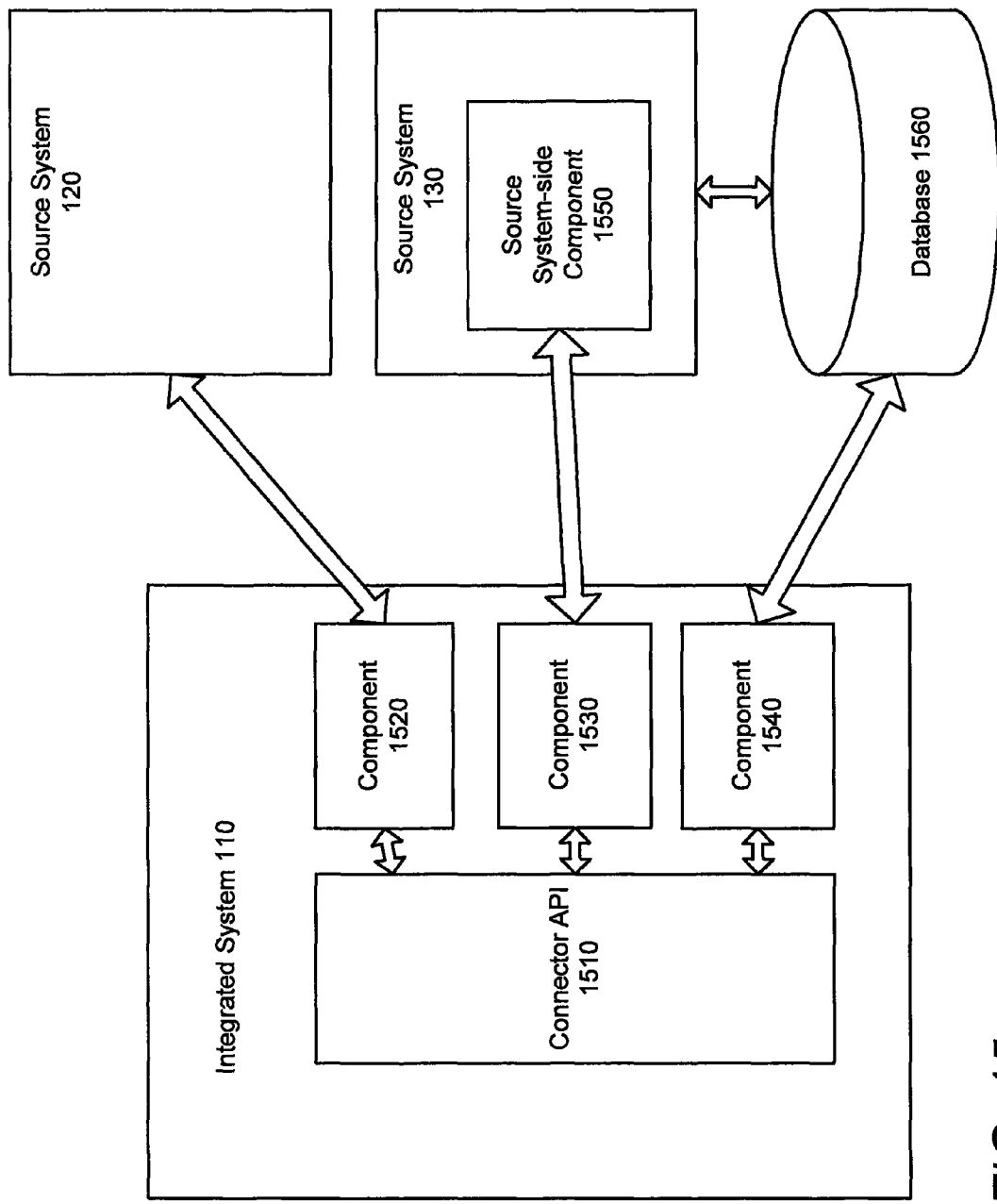
FIG. 15 illustrates use of a connector interface by an integrated system.

FIG. 15 illustrates use of the connector API by integrated system 110. A connector API 1510 is defined for the integrated system 110. An implementation of the connector API, known as a component, is provided. By way of connector API 1510, component 1520 allows for bidirectional exchange of data between integrated system 110 and legacy source system 120. To perform this data exchange, a component may, for example, make use of standard interfaces provided by the source system (as illustrated by components 1520 and corresponding source system 120). Also, a component may have a corresponding source system-side component designed to interact with the component in the integrated system (as illustrated by component 1530 and source system-side component 1550 residing in source system 130). A component might directly access a database 1560 being used by source system 130 (as illustrated by component 1540 and database 1560). Also, a component might perform "screen scraping" types of operations to exchange data with a source system lacking open interfaces for data interchange.

As an alternative, a single component (not depicted) could replace components 1530 and 1540, which exchanges data with source system-side connector 1550 for some features, while the single component directly accesses database 1560 for other features. Additionally, although not depicted, a component can perform multiplexing, in which a single component serves to integrate multiple source systems. Typically, standardized remote procedure calls (RPC), such as SOAP, REST, or RMI, are used for exchanging data. However, the system is protocol agnostic. For direct database access, there are many well-known interfaces, such as ODBC and JDBC.

The following are examples of functions and features which may be provided via the connector API 1510. First, a set of functions relates to user authentication, enabling the delegation of authentication, such as username/password handling, between the integrated and source systems. These functions include, for example, credential handling for login and logout, and session management, such as managing cookies that authenticate a web browser session. Second, a set of functions allows integrated system 110 to obtain navigation information to particular educational materials on source system 120. For example, integrated system 110 can obtain specific URLs that direct an end user to the desired educational materials. Such functions facilitate access to course management (course home, course edit, course add, and course enrollment), user management (user add, user edit, change password, edit personal information, user course grades, and user portfolio), user credential management (change password, handle forgotten password), and URL rewriting. Third, a set of functions allows for exchanging portlet data with the source system, such as course listing, announcements, calendar, grades, and external links. Fourth, a set of functions allows for creating and deleting announcements on a target system. In one example, such announcements are employed to relay information regarding outcomes system instrument deployments, which is used for course and curriculum assessment. Fifth, a set of functions allows for discovering which portions of the connector API 1510, such as those discussed above, are implemented by a particular component. For example, these functions can allow the integrated system 110 to determine whether various administration functions, or user and course conversion functions that aid migration of educational materials and data, are available. Sixth, a set of functions provides interfaces for managing the state of integrated data (for example, user data) and orchestrating course conversion (for example, in the form of packaging educational materials from the source system and importing them to the integrated system). The above functions are merely illustrative of the functions which may be provided by the connector API 1510, and are not intended to be an exclusive list.

Figure 16:
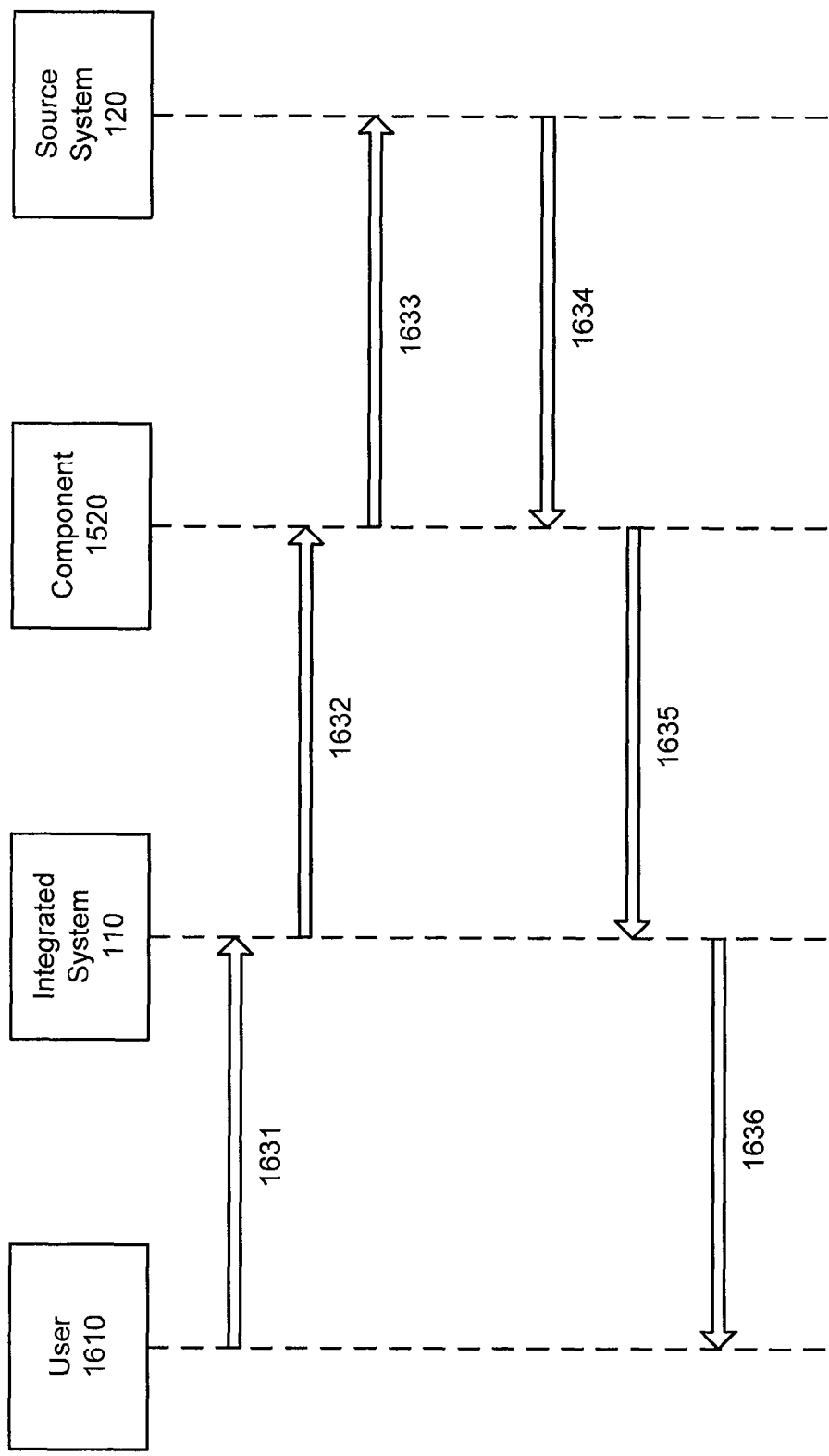
FIG. 16 illustrates use of authentication functions provided by a component, whereby authentication is delegated to a source system.

FIG. 16 illustrates the use of authentication functions provided by a component, whereby authentication is delegated among the systems. As noted previously, one benefit of the integrated environment is the availability of a single sign-on for the systems integrated into the environment. For example, a user can authenticate with integrated system 110, and when directed to educational materials on legacy source system 120 will not have to perform an additional authentication—instead, the necessary authentication is negotiated between the integrated system 110 and source system 120. The connector API 1510 facilitates authentication between systems within an integrated environment. FIG. 15 illustrates an exemplary method by which user 1510, although interacting with integrated system 110, is ultimately authenticated by source system 120. In step 1631, user 1610 provides a password or other credentials to integrated system 110. In step 1632, integrated system 110, by way of the connector API, requests authentication of user 1610 using component 1520, which implements a portion of the connector API 1510 for data interchange with source system 120. In step 1633, component 1520, by way of RPC, requests authentication of user 1610. In step 1634, source system 120 verifies that user 1610 is authenticated. In step 1635, this verification is provided to integrated system 110 by the connector API 1510. In step 1636, integrated system 110 indicates to user 1610 that the user's authentication is accepted, often by providing access to protected educational materials on integrated system 110. A similar series of operations between the integrated system, component, and source system occur with respect to many of the functions provided by the connector API 1510.

The connector API 1510 provides for development and use of components adapted to particular products or user environments. Such components may, for example, be developed and provided by a learning environment product vendor or a system administrator familiar with a given institution. Depending on how such components are provided, existing components may also be modified, so as to be tailored to the configuration of a particular legacy source system. Multiple and diverse legacy source systems can be integrated with integrated system 110, by use of corresponding components that enable data interchange with the legacy source systems.

Although the connector API 1510 is defined to receive requests for the interchange of a wide variety of data, the connector API 1510 is designed to be functionally scalable. This means that benefits of the present invention may be obtained using a component that only implements a subset of the connector API 1510. Of course, a more complete implementation of the connector API 1510 will enable a greater degree of integration between the systems. The degree to which a component has implemented the connector API 1510 is discoverable by the integrated system 110. For example, a specific method call might be defined by the connector API 1510, which returns a bitmap indicating which methods are implemented by the component. As another example, methods which are not fully implemented may provide a return value indicating they are unimplemented by the given component. Based on the connector API 1510 features detected as implemented by a component, integrated system 110 will interact with the source system accordingly.

Also, integrated system 110 provides for granular migration of educational materials from a legacy source system 112 to integrated system 110. Instead of needing to migrate all of the courses and student information system data wholesale between systems, users can consider hosting educational materials natively on integrated system 110 on a course-by-course basis. However, education data, including student information data, may continue to be hosted by the source system, reducing the scale of the effort, making it reasonable to consider moving educational materials on a course-by-course basis. This not only eases the transition of hosting content natively on integrated system 110, but also facilitates ongoing operation of a diverse and integrated production environment, comprising multiple types of learning management systems. Administrators and users are free to selectively move educational materials over to the integrated system. For example, only a few courses within a department may be prepared at a given time to migrate to integrated system 110, or only a single department, comprising a number of courses, from among many departments hosted on a source system 120.

The flexibility of the connector API 1510 enables a wide range of models for integrating an integrated system 110 with legacy source systems 120 and 130. For example, the following models of operation are supported:

As discussed above, an integrated system 110 acts as a portal which aggregates and facilitates access to legacy source systems. A user authenticates herself with integrated system 110, and is able to easily access, through interfaces provided by integrated system 110, legacy source system 120. However, within the portal providing access to legacy source system 120, the original interface of legacy source system 120 is provided.

Focus is directed on providing a consistent user experience, regardless whether a course is hosted by integrated system 110 or legacy source system 120. Visual branding can serve a significant role in this experience by providing a consistent look and feel across classes.

Education data and materials are migrated on a class-by-class basis from a legacy source system 120 to integrated system 110, such that they are hosted natively by integrated system 110. Accordingly, the full range of features offered by integrated system 110 can be applied to the migrated education data and materials.

An existing course may be migrated over to operate natively on integrated system 110 for ongoing instruction of the course, but prior sessions of the original course, such as from prior semesters, might remain on a legacy source system 120.

To reduce the costs associated with administering multiple systems, all of the education data and materials is migrated from legacy source system 120 to be natively hosted by integrated system 110.

As would be recognized by those skilled in the art in view of this disclosure, many other configurations are possible.

The disclosed course-by-course migration enabled by the connector API 1510 helps eliminate a substantial barrier to migrating education data and materials between learning management systems by decoupling the hosting of educational materials and the hosting of education data, such as student information system data. In conventional systems, as noted previously, educational materials and education data have been closely coupled. In such conventional systems, migration has required moving both educational materials and education datawholesale. This increases the risks associated with migration, as in many instances it involves terabytes worth of data which, if not migrated successfully, puts the operation of the entire production system at risk. Additionally, there is the risk of incompatibility for some educational materials as they are migrated to a new system. Further, the process of a full migration is very resource and time consuming. In contrast, the disclosed integrated system 110, via the connector API 1510, is able to migrate educational materials for individual courses for native hosting, but allow source system 120 to continue managing education data, such as student information system data, rather than require the migration of such data to integrated system 110. Integrated system 110 avoids conventional up-front database migration, and eases the effort of migration once it is performed.

Additionally, by allowing legacy source systems in an existing production environment to run "as-is," an integrated system can be readily added to the production environment for limited testing and evaluation of the features offered by the integrated system. This facilitates evaluation by institutions considering use of the integrated system.

In some conventional applications, translation modules may be developed to perform a unidirectional transfer of data, with the intent of establishing a new and separate production system, to which all of the legacy data is simply ported over. However, according to embodiments of the present invention, bi-directional data transfer provided by components not only allows this "fresh install" option, but further allows for side-by-side operation of legacy source and integrated systems in a heterogeneous production environment, while maintaining data consistency, particularly for user data, among the various systems. In some production environments, legacy source systems may be maintained, despite the migration of most educational materials for native hosting on an integrated system, to incorporate educational materials which, at least for the short term, is most readily provided and/or maintained by a legacy source system.

Further, by providing a modular component-based architecture for integrating with legacy source systems, users can employ vendor or third-party modules to translate between the two systems. This reduces the scope of an integration or migration effort, as it avoids a major difficulty presented in translating data between the systems. Also, different components can provide different methods of converting educational materials. For example, if a user is disappointed in the way a first component converted a test, the user might opt to use a second component which may yield a more satisfactory result.

Command line or GUI tools may be provided to an administrator to facilitate migrating users and courses to be natively hosted by the integrated system.

In some embodiments, critical administrative data will be replicated and synchronized between integrated system 110 and legacy source system 120, via connector API 1510. For example, such data might include administrative course information, administrative user information, enrollments lists, and portal content.

Source systems 120 and 130 may include learning management systems provided by vendors other than the vendor providing integrated system 110. Alternatively, source system 120, for example, might be a different, typically older version of the integrated system 110 product. In either case, the connector API 1510 provides a bridge that facilitates operating in a "co-production" environment, in which varying types of systems are integrated, and eventually migrating education data and materials to integrated system 110 to realize reduced administration costs and exploit improved features offered by integrated system 110. Thus, the connector API serves as a bridge for moving to an entirely different learning management system vendor, providing an upgrade path within a single vendor's line of learning management system products, or allows for a diverse set of learning management systems to be integrated in a manner that eases the process of administration and provides the benefits of integration to end users.

The integrated system provides more than a simple redirect to the source system, as seen with conventional systems, but instead offers an experience that integrates diverse systems within a single environment in a cohesive manner that also allows users to exploit additional features provided by integrated system 110. Such features include single sign-on, allowing users from different systems to collaborate through online groups and other organizations provided by the integrated system, improved management tools, and tools for assessing the effectiveness of classes and curricula. Of benefit for administrators is being able to retain existing, familiar interfaces, but having the option to exercise administrative tools provided by integrated system 110.

Additionally, a more consistent experience can be provided to users by the use of visual themes. The visual themes can be employed to provide a particular visual branding based on a role for the user. For example, different themes may be presented by integrated system 110 based on whether a user is a prospective student, currently enrolled student, or alumnus. Additionally, visual themes can be employed to offer the look and feel of a different system. For example, where a course has been migrated from legacy source system 120 to integrated system 110, a visual theme may be employed to provide continuity in look and feel for students and teachers, while leveraging administrative benefits obtained by hosting the course natively on the integrated system 110. This can minimize adverse end user impact by retaining familiar interfaces. In another example, in which most of the classes are hosted on a legacy source system 120, visual themes can be employed for courses natively hosted on integrated system 110 in order to provide a consistent user experience across the curriculum. Data provided by the connector API 1510, when related features are implemented by a component, provides the information required to perform branding relating to education data and materials hosted by legacy source system 120. Additionally, integrated system 110 may store an indication as to whether a legacy or native visual theme should be applied in a given context.

Also, the component interface can be used to pass activity data from a legacy source system to integrated system 110. Accordingly, integrated system 110 becomes a point of aggregation for profiling information, which allows users such as administrators and teachers to better understand utilization of the systems. Similarly, outcomes data, or systematic data regarding student learning results, can also be passed to integrated system 110, to facilitate campus-wide performance assessment efforts.

The foregoing description has been presented for purposes of illustration. It is not exhaustive and does not limit the invention to the precise forms or embodiments disclosed. Modifications and adaptations of the embodiments will be apparent from consideration of the specification and practice of the disclosed embodiments. Although the steps of the above methods are indicated in a particular order, one of ordinary skill will appreciate that order of the steps may be changed and, in some implementations, some steps may be optional. Furthermore, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, embodiments may use different types of computer-readable media, such as secondary storage devices, for example, hard disks, floppy disks, or CD-ROM, the Internet or other propagation medium, or other forms of RAM or ROM.

Computer programs based on the written description and methods of this specification are within the skill of a software developer. The various programs or program modules can be created using a variety of programming techniques. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments have been described herein, the scope of the invention includes any and all embodiments having equivalent elements, modifications, omissions, combinations (e.g., of aspects across various embodiments), adaptations and/or alterations based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps. It is intended, therefore, that the specification and examples be considered as exemplary only, with a true scope and spirit of the invention being indicated by the following claims and their full scope of equivalents.

What is claimed is:

1. A computer-implemented method for integrating learning management systems, the method comprising:
   providing on a first server an integrated learning management system adapted to exchange education data and materials via a connector interface;
   providing on the first server a first component which responds to requests made by the integrated system via the connector interface to exchange education data and materials with a first source learning management system;
   exchanging education data or materials between the integrated system and the first system via the first component by use of the connector interface;
   hosting first educational materials corresponding to a first course on the integrated system, the first educational materials having been previously hosted on the first source system; and
   obtaining via the connector interface first educational data corresponding to the first educational materials from the first source system, in response to accessing the first educational materials hosted on the integrated system.

2. The method of claim 1, further comprising:
   providing on the first server a second component which responds to requests made by the integrated system via the connector interface to exchange education data and materials with a second source learning management system; and
   exchanging education data or materials between the integrated system and the second system via the second component by use of the connector interface.

3. The method of claim 1, further comprising:
   exchanging education data or materials with a second source learning management system via the first component by use of the connector interface.

4. The method of claim 1, further comprising:
   providing on the first server a second component which responds to requests made by the integrated system via the connector interface to exchange education data and materials with a database, said database storing education data and materials being used by a second source learning management system for storing education data and materials; and
   receiving education data or materials from the database via a request made by the integrated system to the connector interface.

5. The method of claim 1, further comprising:
   providing a user interface, via the integrated system, by which educational materials are displayed to a user; and
   selecting visual elements provided by the user interface in response to a detected role of the user with respect to the educational materials.

6. The method according to claim 1, wherein
   the first educational data comprises course availability or course enrollment data.

7. The method according to claim 1, further comprising:
   providing a user interface, via the integrated system, by which educational materials hosted on the first source system are displayed to a user enrolled in a course; and
   selecting visual elements provided by the user interface for displaying the educational materials, based on an indication that visual elements used to the display the educational materials are to correspond to visual elements used to display educational materials hosted by the integrated system.

8. The method according to claim 1, further comprising:
providing a user interface, via the integrated system, by which educational materials hosted on the integrated system are displayed to a user enrolled in a course; and
selecting visual elements provided by the user interface for displaying the educational materials, based on an indication that visual elements used to the display the educational materials are to correspond to visual elements used to display educational materials hosted by a different learning management system.

9. The method according to claim 1, further comprising:
determining capabilities of the first component for exchanging education data and materials by a query performed via the connector interface; and
adjusting operations performed by the integrated system in response to a result of the query.

10. An integrated system for integrating learning management systems, the system comprising:
a connector interface adapted to exchange education data and materials in response to a first request by the integrated system; and
a first component that exchanges education data and materials with a first source learning management system, in response to the first request made to the connector interface,
wherein the integrated system is adapted to host first educational materials corresponding to a first course transferred from the source system, and the integrated system is adapted to issue an educational data request to the connector interface in response to access of the first educational materials hosted on the integrated system.

11. The integrated system of claim 10, further comprising:
a second component that exchanges education data and materials with a second source learning management system, in response to a second request made to the connector interface.

12. The integrated system of claim 10, wherein
the first component exchanges education data and materials with a second source learning management system, in response to a second request made to the connector interface.

13. The integrated system of claim 10, further comprising:
a second component that retrieves education data and materials from a database, said database being used by a second source learning management system for storing education data and materials.

14. The integrated system of claim 10, further comprising:
a user interface that provides educational materials for display to a user, and selects visual elements provided to the user in response to a detected role of the user with respect to the educational materials.

15. The integrated system of claim 10, wherein
the connector interface provides course availability or course enrollment data to the integrated system in response to the educational data request.

16. The integrated system of claim 10, further comprising:
a user interface that provides educational materials for display to a user, and selects visual elements provided to the user based on an indication that visual elements used to display the educational materials correspond to visual elements used to display educational materials hosted by the integrated system.

17. The integrated system of claim 10, further comprising:
a user interface that provides educational materials for display to a user, and selects visual elements provided to the user based on an indication that visual elements used to display the educational materials correspond to visual elements used to display educational materials hosted by a different learning management system.

18. The integrated system of claim 10, wherein
the connector interface is responsive to a capability request from the integrated system;
the first component is adapted to indicate its capabilities for exchanging education data and materials in response to the capability request; and
operations performed by the integrated system are responsive to a result of the capability request.

19. A computer-readable storage medium containing instructions which, when executed by a computer, cause the computer to perform the method comprising:
providing on a first server an integrated learning management system adapted to exchange education data and materials via a connector interface;
providing on the first server a first component which responds to requests made by the integrated system via the connector interface to exchange education data and materials with a first source learning management system;
exchanging education data or materials between the integrated system and the first system via the first component by use of the connector interface;
hosting first educational materials corresponding to a first course on the integrated system, the first educational materials having been previously hosted on the first source system; and
obtaining via the connector interface first educational data corresponding to the first educational materials from the first source system, in response to accessing the first educational materials hosted on the integrated system.

20. The computer-readable storage medium of claim 19, the method further comprising:
providing on the first server a second component which responds to requests made by the integrated system via the connector interface to exchange education data and materials with a second source learning management system; and
exchanging education data or materials between the integrated system and the second system via the second component by use of the connector interface.

21. The computer-readable storage medium of claim 19, the method further comprising:
exchanging education data or materials with a second source learning management system via the first component by use of the connector interface.

22. The computer-readable storage medium of claim 19, the method further comprising:
providing on the first server a second component which responds to requests made by the integrated system via the connector interface to exchange education data and materials with a database, said database storing education data and materials being used by a second source learning management system for storing education data and materials; and
receiving education data or materials from the database via a request made by the integrated system to the connector interface.

23. The computer-readable storage medium of claim 19, the method further comprising:
  providing a user interface, via the integrated system, by which educational materials are displayed to a user; and
  selecting visual elements provided by the user interface in response to a detected role of the user with respect to the educational materials.

24. The computer-readable storage medium according to claim 19, wherein
  the first educational data comprises course availability or course enrollment data.

25. The computer-readable storage medium according to claim 19, the method further comprising:
  providing a user interface, via the integrated system, by which educational materials hosted on the first source system are displayed to a user enrolled in a course; and
  selecting visual elements provided by the user interface for displaying the educational materials, based on an indication that visual elements used to the display the educational materials are to correspond to visual elements used to display educational materials hosted by the integrated system.

26. The computer-readable storage medium according to claim 19, the method further comprising:
  providing a user interface, via the integrated system, by which educational materials hosted on the integrated system are displayed to a user enrolled in a course; and
  selecting visual elements provided by the user interface for displaying the educational materials, based on an indication that visual elements used to the display the educational materials are to correspond to visual elements used to display educational materials hosted by a different learning management system.

27. The computer-readable storage medium according to claim 19, the method further comprising:
  determining capabilities of the first component for exchanging education data and materials by a query performed via the connector interface; and
  adjusting operations performed by the integrated system in response to a result of the query.

* * * * *